United States Patent
Diloyan et al.

(10) Patent No.: US 12,415,966 B2
(45) Date of Patent: Sep. 16, 2025

(54) GREASE COMPOSITION INCLUDING INORGANIC FULLERENE-LIKE PARTICLES

(71) Applicants: NANOTECH INDUSTRIAL SOLUTIONS, Chalfont, PA (US); NYNAS AB, Stockholm (SE)

(72) Inventors: George Diloyan, Westfield, NJ (US); Mehdi Fathi-Najafi, Gothenburg (SE); Jinxia Li, Lulea (SE); Vasyl Ignatyshyn, Matawan, NJ (US)

(73) Assignees: NYNAS AB, Stockholm (SE); Nanotech Industrial Solutions, Chalfont, PA (US)

( * ) Notice: Subject to any disclaimer, the term of this patent is extended or adjusted under 35 U.S.C. 154(b) by 0 days.

(21) Appl. No.: 18/020,147

(22) PCT Filed: Aug. 9, 2021

(86) PCT No.: PCT/US2021/045219
§ 371 (c)(1),
(2) Date: Feb. 7, 2023

(87) PCT Pub. No.: WO2022/032225
PCT Pub. Date: Feb. 10, 2022

(65) Prior Publication Data
US 2023/0303943 A1   Sep. 28, 2023

Related U.S. Application Data

(60) Provisional application No. 63/062,853, filed on Aug. 7, 2020, provisional application No. 63/062,731, filed on Aug. 7, 2020.

(51) Int. Cl.

| | | |
|---|---|---|
| *C10M 169/00* | (2006.01) | |
| *C10M 105/04* | (2006.01) | |
| *C10M 105/06* | (2006.01) | |
| *C10M 117/02* | (2006.01) | |
| *C10M 125/22* | (2006.01) | |
| C10N 20/06 | (2006.01) | |
| C10N 50/10 | (2006.01) | |

(52) U.S. Cl.
CPC ........ *C10M 169/00* (2013.01); *C10M 105/04* (2013.01); *C10M 105/06* (2013.01); *C10M 117/02* (2013.01); *C10M 125/22* (2013.01); C10M 2201/084 (2013.01); C10M 2203/1025 (2013.01); C10M 2203/1065 (2013.01); C10M 2207/1265 (2013.01); C10N 2020/06 (2013.01); C10N 2050/10 (2013.01)

(58) Field of Classification Search
CPC  C10M 169/00; C10M 105/04; C10M 105/06; C10M 117/02; C10M 125/22; C10M 2201/084; C10M 2203/1025; C10M 2203/1065; C10M 2207/1265; C10M 125/00; C10M 2201/041; C10M 2201/065; C10M 2201/066; C10M 2207/1256; C10N 2020/06; C10N 2050/10; C10N 2020/02; C10N 2020/061; C10N 2030/06; C01B 19/007; B82Y 30/00

See application file for complete search history.

(56) References Cited

U.S. PATENT DOCUMENTS

| | | | |
|---|---|---|---|
| 9,777,132 B2* | 10/2017 | Kverel | ............... C09D 163/00 |
| 10,364,401 B2 | 7/2019 | Soto-Castillo et al. | |
| 2012/0165104 A1* | 6/2012 | Bardin | ............... C10M 125/00 464/7 |
| 2020/0115608 A1 | 4/2020 | Kverel et al. | |

FOREIGN PATENT DOCUMENTS

| | | |
|---|---|---|
| FR | 2949786 A1 | 3/2011 |
| WO | 2014033634 A2 | 3/2014 |
| WO | 2017120207 A1 | 7/2017 |

OTHER PUBLICATIONS

India Examination Report. Intellectual Property India. Indian Application No. 202317014970. Dated Feb. 14, 2025.
FR2949786A1—Google Patents English Translation.

* cited by examiner

*Primary Examiner* — Cephia D Toomer
(74) *Attorney, Agent, or Firm* — Sorell, Lenna & Schmidt, LLP

(57) ABSTRACT

A grease composition that includes at least an oil-based medium, a thickener, and a fullerene-like nano-structure. The fullerene-like nano-structure includes a plurality of layers each comprised of a metal chalcogenide composition has a molecular formula of $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof.

20 Claims, 14 Drawing Sheets

GREASE COMPOSITION INCLUDING INORGANIC FULLERENE-LIKE PARTICLES

CROSS REFERENCE TO RELATED APPLICATION

The present invention claims the benefit of the whole contents and disclosure of PCT/US21/45219 filed on Aug. 9, 2021, which is incorporated by reference as is fully set forth herein.

The present invention claims the benefit of U.S. provisional patent application 63/062,731 filed on Aug. 7, 2020 the whole contents and disclosure of which is incorporated by reference as is fully set forth herein.

The present invention also claims benefit to U.S. provisional patent application 63/062,853 filed on Aug. 7, 2020.

FIELD OF THE INVENTION

The present disclosure relates to fullerene like particles. More particularly, the present disclosure relates to lubricating grease compositions with a low coefficient of friction, high load carrying capability and low wear scar.

BACKGROUND

A typical grease consists of at least an oil, a thickener, and one or several type of additives. Lubricating grease is a type of shear-thinning or pseudo-plastic fluid, which means that the viscosity of the fluid is reduced under shear. After sufficient force to shear the grease has been applied, the viscosity drops and subsequently its film thickness. This sudden drop of film thickness may then jeopardize the performance of the grease in tribological contacts. Hence, the use of performance additives that is capable to maintain the metal surfaces apart within a wide operating temperature and challenging conditions are essential to a long and healthy service life of the tools and machines.

SUMMARY OF THE INVENTION

In one embodiment of the present disclosure, a grease composition is provided that includes an oil based medium; a thickener; and a fullerene-like nano-structure comprising a plurality of layers each comprised of a metal chalcogenide composition has a molecular formula of $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. The fullerene-like nano-structure is present in the grease composition as a dispersion of substantially non-agglomerated particles with diameter of less than 380 nm.

In another embodiment of the present disclosure, a grease composition is provided that includes a naphthenic containing oil-based medium; a lithium containing thickener; and a fullerene-like nano-structure having a composition selected from the group consisting of tungsten disulfide ($WS_2$), molybdenum disulfide ($MoS_2$) and combinations thereof. The fullerene-like nano-structure is present in the grease composition as a dispersion of substantially non-agglomerated particles. In some embodiments, the naphthenic containing oil-based medium is further mixed with a group I or group II paraffinic oil. In some embodiments, when the fullerene-like structure is composed of molybdenum disulfide ($MoS_2$), the particle size for the material may range from 1.5 µm to 2 µm. In some embodiments, when the fullerene like structure is composed of tungsten disulfide ($WS_2$), the particle size for the material may range from 50 nm to 180 nm. In some embodiments, at relatively low concentration, e.g., 1 wt %, the addition of the fullerene-like structures can increase the load capacity of the grease when compared to similar composition greases not including additives of metal chalcogenide inorganic fullerene geometry nanostructures. For example, when measured using 4 ball weld loading testing in accordance with ASTM D2596, a 1 wt. % addition of the aforementioned composition inorganic fullerene structures can provide an increase in weld load of 25% or greater, when compared to the weld load of similar composition greases not including additives of metal chalcogenide inorganic fullerene geometry nanostructures. In other examples, the addition of 1 wt. % of the aforementioned composition inorganic fullerene structures can provide an increase in weld load of 100% or greater, when compared to the weld load of similar composition greases not including additives of metal chalcogenide inorganic fullerene geometry nanostructures. In yet further example, the addition of 1 wt. % can provide an increase in weld load approaching close to 300% when compared to the weld load of similar composition greases not including additives of metal chalcogenide inorganic fullerene geometry nanostructures. Decreases in wear scaring, as well as decreases in 4-ball friction coefficients were also measured for the grease compositions including the metal chalcogenide inorganic fullerene geometry nanostructures.

In yet another embodiment of the present invention, the present disclosure describes a method of forming a grease composition, which includes a dispersion of inorganic fullerene like nanoparticles. In one embodiment, the method of forming the grease includes forming a liquid dispersion containing a fullerene-like nano-structure comprising a plurality of layers each comprised of a metal chalcogenide composition that has a molecular formula of $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. In a following step, the method can continue with providing a mixture of an oil-based medium with the liquid dispersion containing the fullerene-like nano-structure. In some embodiments, the method may include blending a metallic soap with the mixture to provide the grease, wherein the fullerene-like nano-structure is present in the grease as substantially non-agglomerated particles with diameter of less than 380 nm.

BRIEF DESCRIPTION OF THE DRAWINGS

The following detailed description, given by way of example and not intended to limit the disclosure solely thereto, will best be appreciated in conjunction with the accompanying drawings, wherein like reference numerals denote like elements and parts, in which.

DETAILED DESCRIPTION

Detailed embodiments of the present disclosure are described herein; however, it is to be understood that the disclosed embodiments are merely illustrative of the compositions, structures and methods of the disclosure that may be embodied in various forms. In addition, each of the examples given in connection with the various embodiments are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the compositions, structures and methods disclosed herein. References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. When a numerical range is provided, the range includes each value within the range, as well as the end points of the range.

The present invention relates to lubricating grease compositions with a low coefficient of friction, high load carrying capability and low wear scar. A "grease" includes at least of an oil, a thickener, and one or several type of additives. Lubricating grease is a type of shear-thinning or pseudo-plastic fluid, which means that the viscosity of the fluid is reduced under shear. After sufficient force to shear the grease has been applied, the viscosity drops and subsequently its film thickness also reduces. The grease compositions that are described herein include a fullerene-like nano-structure having a metal chalcogenide composition, wherein the fullerene-like nano-structure is present in the grease composition as a dispersion.

As used herein, the term "fullerene-like" denotes a substantially spherical geometry. In some instances, the fullerene-like structures may be perfectly spherical, i.e., having the form of a sphere. The spherical nature of the metal chalcogenide fullerene-like structures provided herein is distinguished from metal chalcogenide nanostructures that may be oblong, oval (e.g., open ended oval), football shaped, columnar shaped, plate-like shaped, or any irregularly shaped particle that deviates from being spherical which typically results from a method of reducing particle size physically, such as milling of particles from the macro and micron scale to the nanometer scale. Or the milling of particles from a larger nanoscale size to a less nanoscale size.

Figure 1:
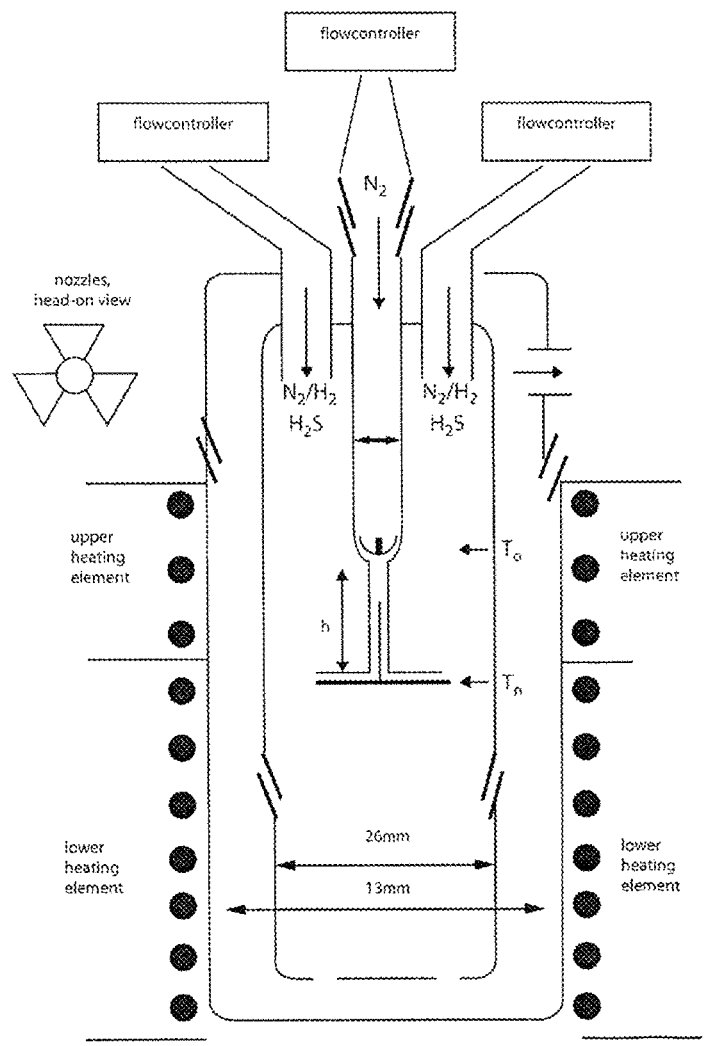
FIG. 1 is a schematic view illustrating one embodiment of chemical reactor for forming some examples of metal chalcogenide nanoparticles, such as fullerene-like nanoparticles, in accordance with one embodiment of the present disclosure.

The spherical nature of the metal chalcogenide composition fullerene-like structures provided by the present disclosure results from being synthesized within the nano-sized regime using chemical methods. For example, synthesis of inorganic fullerene-like molybdenum disulfide (IF—$MoS_2$) may be based upon the sulfidization of amorphous $MO_3$, e.g., $MO_3$ thin films, in a reducing atmosphere at elevated temperatures (e.g., ~850° C.). It is noted that the metal chalcogenide IFs, such as IF—$MoS_2$, can also be synthesized using high-temperature methods that occur above 650° C. These methods typically involve such techniques as growth from gas phase, e.g., in which $MoO_3$ in the vapor phase is reached with $H_2S$ in a carrier, as employed in the apparatus depicted in FIG. 1. One embodiment, of the process that may be consistent with the apparatus depicted in FIG. 1 includes the use of $MoO_3$ powder placed in the inner part of the reactor (a) which can be heated to a temperature of approximately 780° C. Molecular clusters $(MoO_3)_3$ can be formed and carried down through the reactor by $N_2$ gas. Hydrogen gas diffuses through the nozzles (c) from the outer reactor (b) and starts to react with the molecular clusters. The mild reduction conditions yield reduced $MoO_3$ clusters, which are less volatile, and form $MoO_3$ nanosize particles at the low part of (a). The suboxide nanoparticles reach a size less than 5 nm before the sulfidization step. The coated oxide nanoparticles are swept by the carrier gas outside the reactor (a). Because the nanoparticles are surface-passivated, they land on the ceramic filter (d) and the oxide-to-sulfide conversion continues within the core without coalescence of the nanoparticles. The gas-phase reactor synthesis process generates pure IF—$MoS_2$ phase, and can control the size and shape of the nanoparticles. In other embodiments, inorganic materials having the metal chalcogenide composition, e.g., $WS_2$, and the fullerene-like geometry and/or tubular-like geometry may be produced via sulfidization of tungsten oxide nanoparticles in reduction atmosphere in fluidized bed reactor.

The inorganic materials having the metal chalcogenide composition and the fullerene-like geometry and/or tubular-like geometry may also be formed in accordance with at least one of the methods disclosed in U.S. Patent Application Publication No. 2006/0120947, U.S. Pat. Nos. 7,524,481, 6,217,843, 7,641,869, U.S. Patent Application Publication No. 2010/0172823, U.S. Pat. Nos. 6,710,020, 6,841,142, 7,018,606, 8,513,364, 8,329,138, 7,959,891, 7,018,606, U.S. Patent Application Publication No. 2013/0109601, U.S. Patent Application Publication No. 2010/0227782 and U.S. Pat. No. 7,641,886, which are each incorporated herein in their entirety. The inorganic materials having the metal chalcogenide composition and the fullerene-like geometry and/or tubular-like geometry formed using the methods within the scope of the above provided description can have a very small particle size distribution. It is noted that the methods disclosed in the aforementioned patents are only some examples of methods that are suitable for forming the inorganic materials having the metal chalcogenide composition and the fullerene-like and/or tubular-like geometry. Any method may be employed for forming the above-described inorganic materials having the metal chalcogenide composition, so long as the compound formed has a fullerene-like and/or tubular-like geometry.

Figure 2A:
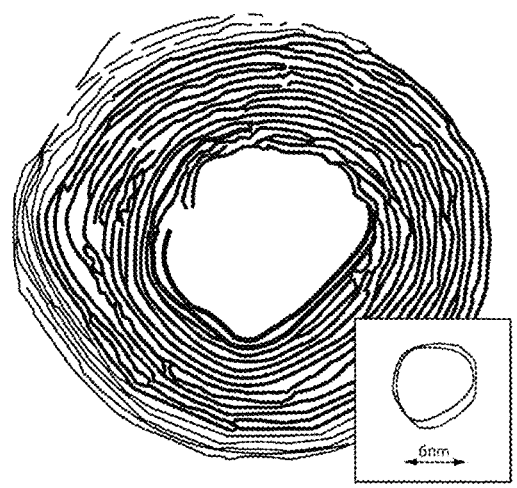
FIG. 2A is an illustration of a transmission electron microscope (TEM) image of a metal chalcogenide nanoparticle having a molecular formula $MX_2$ and a fullerene-like geometry that is spherical, in accordance with one embodiment of the present disclosure.
Figure 2B:
FIG. 2B is a transmission electron microscope (TEM) images of a metal chalcogenide nanoparticle having a molecular formula $MX_2$ and a fullerene-like geometry, in accordance with one embodiment of the present disclosure.
Figure 2C:
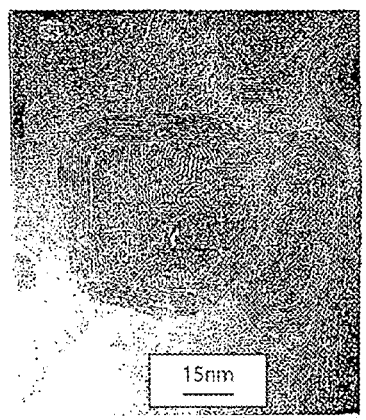
FIG. 2C is a transmission electron microscope (TEM) images of a metal chalcogenide nanoparticle having a molecular formula $MX_2$ and a fullerene-like geometry, in accordance with another embodiment of the present disclosure.
Figure 3:
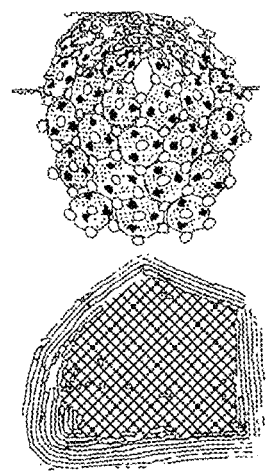
FIG. 3 is an illustration of the chemical structure of a fullerene-like $MoS_2$ nanoparticle above an illustration of a TEM image of a metal chalcogenide nanoparticle having the molecular formula $MX_2$, in accordance with one embodiment of the present disclosure.
Figure 4:
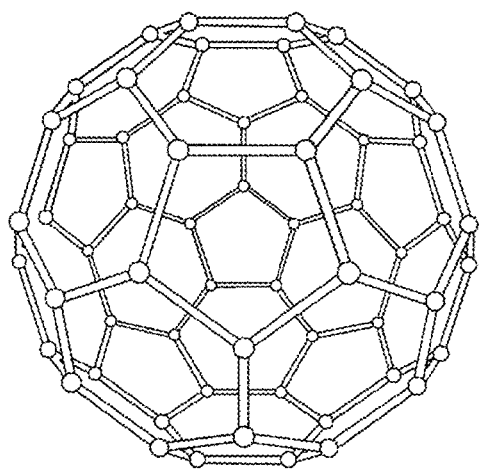
FIG. 4 is an illustration of the chemical structure of carbon 60 fullerene.
Figure 5:
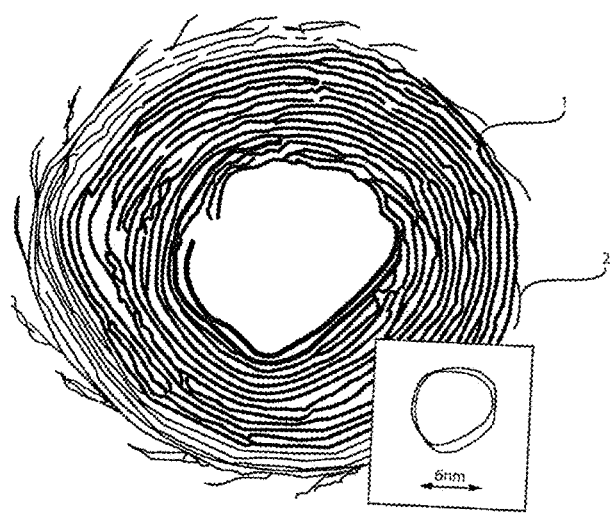
FIG. 5 is an illustration of a transmission electron microscope (TEM) image of a metal chalcogenide nanoparticle having a molecular formula $MX_2$ and a fullerene-like geometry, wherein an outer layer of the multi-layered fullerene-like geometry comprises at least one sectioned portion, in which the sectioned portion may extend along a direction away from the curvature of nanoparticle, in accordance with one embodiment of the present disclosure.

A characteristic image of IF nanoparticles produced in the gas-phase reactor that has been described above is illustrated in FIGS. 2A-2C. FIG. 2A depicts one embodiment of a fullerene-like structures may be perfectly spherical, in accordance with the present disclosure. FIG. 3 is an illustration of the chemical structure of a fullerene-like $MoS_2$ nanoparticle, which is a cage like spherical geometry of molybdenum identified by black circles and sulfur identified by white circles. FIG. 4 is a carbon 60 fullerene structure for comparative purposes. Comparison of FIGS. 3 and 4 illustrates that the that inorganic metal chalcogenide having the caged substantially spherical structure is similar to the caged structure of carbon 60 illustrating a fullerene like arrangement. As discussed above, the fullerene-like structures of metal chalcogenide may be perfectly spherical. FIG. 5 illustrates that the fullerene-like structures disclosed herein may be perfectly spherical, or is very close to a sphere. The particles obtained by the present disclosure can have a more perfect spherical shape, than those obtained by the conventional synthetic tools. This stems from the fact that, according to some embodiments of the present disclosure, the reaction takes place in the gas phase, where an isotropic environment for the reaction prevails. Consequently, much larger oxide nanoparticles could be converted into IF when they flow in the gas stream.

The core of the fullerene-like geometry may be hollow, solid, amorphous, or a combination of hollow, solid and amorphous portions. A fullerene like geometry may also be referred to as having a cage geometry. In one example, an inorganic material having the metal chalcogenide composition with a fullerene like geometry may be a cage geometry that is hollow at its core and layered at is periphery. In another example, an inorganic material having the metal chalcogenide composition with a fullerene like geometry may be a cage geometry that is solid at its core and layered at is periphery. For example, the inorganic material having the metal chalcogenide composition and the fullerene like geometry may be a single layer or double layered structure. The inorganic material having the metal chalcogenide composition and the fullerene like geometry is not limited on only single layer or double layered structures, as the inorganic material may have any number of layers. For example, the metal chalcogenide composition may be layered to include 5 layers to 100 layers of metal chalcogenide material that can exfoliate from the particle. In another embodiment, the metal chalcogenide composition may be layered to include 10 layers to 50 layers of metal chalcogenide material that can exfoliate from the particle. In yet another embodiment, the metal chalcogenide composition may be layered to include 15 layers to 20 layers of metal chalcogenide material that can exfoliate from the particle. These structures are also referred to in the art as being "nested layer structures".

One example of an inorganic material having the metal chalcogenide composition and the fullerene like geometry fullerene-like geometry is depicted in FIGS. 2A-3. FIG. 2A depicts a transmission electron microscope (TEM) image of an inorganic material having a tungsten disulfide ($WS_2$) composition with a fullerene-like geometry. In another example, the inorganic material having the metal chalcogenide composition and the inorganic fullerene like geometry is composed of molybdenum disulfide ($MoS_2$). It is noted that the inorganic material with the fullerene-like geometry that is depicted in FIGS. 2A-3 is not limited to only tungsten disulfide (WS$_2$) and molybdenum disulfide (MoS$_2$). Inorganic materials with a metal chalcogenide composition and having a fullerene-like geometry may have any inorganic composition that meets the formula MX$_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Rg) and combinations thereof, and X is a chalcogen element selected from the group consisting of sulfur (S), selenium (Se), tellurium (Te), oxygen (O) and combinations thereof.

The inorganic material having the metal chalcogenide composition and fullerene-like geometry may have a diameter ranging from 1 nm to 380 nm. In another embodiment, the inorganic material having the metal chalcogenide composition and the fullerene-like geometry may have a diameter ranging from 2 nm to 300 nm. In yet another embodiment, the inorganic material having the metal chalcogenide composition and the fullerene-like geometry may have a diameter ranging from 5 nm to 250 nm. The inorganic material having the metal chalcogenide composition and the fullerene-like geometry may have a diameter that is any value within the above ranges. It is noted that the above dimensions are provided for illustrative purposes only and are not intended to limit the present disclosure. In some embodiments, most of the nanoparticles will have diameters ranging between 10 nm to 300 nm, and even more typically will have diameters between 30 nm to 200 nm.

The above-described particles may be referred to as "fullerene-like geometry without a sectioned outer layer".

FIG. 5 depicts one embodiment of a multi-layered fullerene-like nanoparticle structure having a sectioned outer layer. In some embodiments, the sectioned portions of the outer layer protrude from the surface of the nanoparticle. In some embodiments, the multi-layered fullerene-like nano-structure includes a plurality of layers 1 each comprised of an metal chalcogenide composition having a molecular formula of MX$_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. Two example compositions for the structure depicted in FIG. 5 include MoS$_2$ and WS$_2$. An outer layer of the multi-layered fullerene-like structure comprises at least one sectioned portion 2. The at least one sectioned portion 2 extends along a direction away from the curvature of the multi-layered fullerene-like nano-structure. The at least one sectioned portion 2 is engaged to remaining section of the outer layer. FIG. 5 illustrates one embodiment of a section outer layer for a particle that may be referred to as "fullerene-like geometry with a sectioned outer layer".

The multi-layered fullerene-like nano-structure including the sectioned layer can be substantially spherical, and in some instances may include layers that are perfectly spherical. The core of the multi-layered fullerene-like nano-structure having the sectioned outer layer may be hollow, solid, amorphous, or a combination of hollow, solid and amorphous portions. In some embodiments, the at least one sectioned portion 2 that extends along a direction away from the curvature of the multi-layered fullerene-like nano-structure extends along a direction that is tangent to the curvature surface of the multi-layered fullerene-like nano-structure. The at least one sectioned portion 2 that extends along a direction away from the curvature of the multi-layered fullerene-like nano-structure may extends along a direction that can be close to being substantially normal to the curvature surface of the multi-layered fullerene-like nano-structure.

The inorganic material having the metal chalcogenide composition and the fullerene like geometry with the sectioned outer layer is not limited on only single layer or double layered structures, as the inorganic material may have any number of layers. For example, the metal chalcogenide composition may be layered to include 5 layers to 100 layers of metal chalcogenide material that can exfoliate from the particle. In another embodiment, the metal chalcogenide composition may be layered to include 10 layers to 50 layers of metal chalcogenide material that can exfoliate from the particle. In yet another embodiment, the metal chalcogenide composition may be layered to include 15 layers to 20 layers of metal chalcogenide material that can exfoliate from the particle. These structures are also referred to in the art as being "nested layer structures".

The inorganic material having the metal chalcogenide composition and fullerene-like geometry with sectioned outer layer as depicted in FIG. 5 may have a diameter ranging from 1 nm to 380 nm. In another embodiment, the inorganic material having the metal chalcogenide composition and the fullerene-like geometry may have a diameter ranging from 2 nm to 300 nm. In yet another embodiment, the inorganic material having the metal chalcogenide composition and the fullerene-like geometry with sectioned outer layer, as depicted in FIG. 5, may have a diameter ranging from 5 nm to 250 nm. The inorganic material having the metal chalcogenide composition and the fullerene-like geometry may have a diameter that is any value within the above ranges. It is noted that the above dimensions are provided for illustrative purposes only, and are not intended to limit the present disclosure. In some embodiments, most of the nanoparticles will have diameters ranging between 20 nm to 380 nm, and even more typically will have diameters between 30 nm to 200 nm.

The sectioned portions of the outer layer may be present around an entire outer surface of the substantially spherical nanoparticle. The outer layer including the plurality of sectioned portions comprises dangled bonds that provide a charged surface of the outer layer of the multi-layered fullerene-like nano-structure. In one embodiment, the section portions 2 of the outer layer have a length ranging from 1% to 80% of a diameter of the multi-layered fullerene-like nano-structure, e.g., 1% to 70% of the multi-layered fullerene-like nano-structure.

In some embodiments, the outer layer of the multi-layered fullerene-like nano-structure is functionalized with a functionalizing agent selected from the group consisting of silanes, thiols, ionic, anionic, cationic, nonionic surfactants, amine based dispersant and surfactants, succinimide groups, fatty acids, acrylic polymers, copolymers, polymers, monomers and combinations thereof. Any of the functionalizing agents described in this paper are suitable for use with the multi-layered fullerene-like nano-structure having the sectioned outer layer.

Although, fullerene like structures have been specifically described, metal chalcogenides tube-like structures having an outer layer that includes at least one sectioned portion or does not include sectioned portions is within the scope of the present disclosure; and may be substituted for the fullerene like structures or used in combination with the fullerene like structures described herein. For example, the at least one sectioned portion of the outer layer of the multilayered tube-like structure of metal chalcogenide may extend along a direction away from the curvature of the multi-layered tube-like nano-structure, the at least one sectioned portion engaged to remaining section of the outer layer.

The multi-layered fullerene-like structure comprises at least one sectioned portion that is depicted in FIG. 5 may be formed beginning with the multilayered fullerene like structures that are formed using the methods described above for the "fullerene-like geometry without a sectioned outer layer". More specifically, beginning with a multi-layered fullerene-like structure that does not include a sectioned outer layer, a force is applied to open up sections in the outer layer, which peels a portion of the outer layer from the curvature of the multi-layered fullerene-like structure. The force may be applied using any means to apply a physical force to the particles, such as milling, e.g., dry and/or wet milting, sonification, ultrasonication, and combinations thereof. The time and force is dependent upon the degree of sectioning preferred in the outer layer.

The sectioned outer layer provides a charged surface for the nanoparticle. The charged surface that results from the sectioned outer layer facilitates grafting of functional groups onto the multi-layered fullerene-like structure, which can be used to control rheology of dispersions and mixtures including the multi-layered fullerene-like structure having the sectioned outer layer. For example, the functionalized sectioned outer layer may allow for the multi-layered fullerene-like structure to be dispersed more easily than multi-layered fullerene-like structures that do not include the sectioned outer layer. Further, the sectioned outer layer can allow for layers of metal chalcogenide to be exfoliated in response to lower pressures and forces in lubrication of frictional surfaces, and repair of frictional surfaces in comparison to multi-layered fullerene-like structure that do not include the sectioned outer layer.

As noted, the fullerene like particles described above may be employed in a dispersion in a grease composition, and my further include nanoparticles having a tubular-like geometry. Further, in some additional embodiments, the nanoparticles having a tubular-like geometry may be substituted for the fullerene like particles. The component of the coating that is provided by the inorganic material of the metal chalcogenide composition may also have tubular-like geometry. As used herein, the term "tubular-like geometry" denotes a columnar or cylindrical geometry, in which one axis of the intercalation compound. In some embodiments, an inorganic material having the metal chalcogenide composition and the tubular-like geometry may be a cage geometry that is hollow at its core and layered at its periphery. In other embodiments, an inorganic material having the metal chalcogenide composition and the tubular-like geometry may be a cage geometry that is solid at its core, and/or amorphous at its core, and layered at its periphery. For example, the inorganic material having the metal chalcogenide composition and the tubular-like geometry may be a single layer or double layered structure. These structures are also referred to in the art as being "nested layer structures". The number of layers in the inorganic material having the metal chalcogenide composition and the tubular-like geometry may be similar to the number of layers in the inorganic material having the metal chalcogenide composition and the fullerene-like geometry. In some examples, the minimum number of layers for the inorganic material having the tubular-like geometry is approximately 4 layers.

Figure 6:
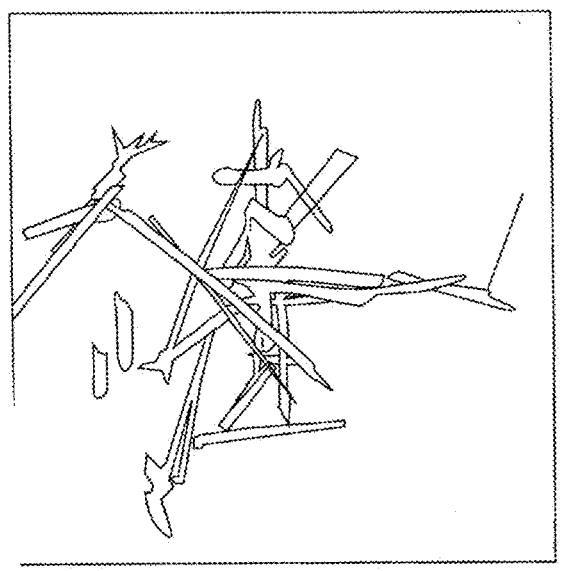
FIG. 6 is an illustration of a transmission electron microscope (TEM) image of a metal chalcogenide having a molecular formula $MX_2$ and a tubular-like geometry, in accordance with one embodiment of the present disclosure.

One example of an inorganic material having the metal chalcogenide composition and the tubular-like geometry is depicted in FIG. 6. FIG. 6 depicts a transmission electron microscope (TEM) image of an intercalation compound having a tungsten disulfide ($WS_2$) composition with an inorganic tubular-like geometry. In another example, the inorganic material having the metal chalcogenide composition and the tubular-like geometry is composed of molybdenum disulfide ($MoS_2$). It is noted that the inorganic material having the metal chalcogenide composition and the tubular-like geometry that is depicted in FIG. 6 is not limited to only tungsten disulfide ($WS_2$) and molybdenum disulfide ($MoS_2$). Inorganic materials having a tubular-like geometry may have any inorganic composition that meets the formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), and combinations thereof, and X is a chalcogen element selected from the group consisting of sulfur (S), selenium (Se), tellurium (Te) and oxygen (O).

The inorganic materials having the metal chalcogenide composition and the tubular-like geometry may have a diameter, i.e., distance perpendicular to the greatest axis of the tubular-like geometry, ranging from 1 nm to 380 nm. In another embodiment, the inorganic materials having the metal chalcogenide composition and the tubular-like geometry may have a diameter ranging from 5 nm to 300 nm. In yet another embodiment, the inorganic materials have the metal chalcogenide composition and the tubular-like geometry with a diameter ranging from 10 nm to 200 nm. The inorganic materials having the metal chalcogenide composition and the tubular-like geometry may have a length, i.e., greatest axis of the tubular-like geometry, that ranges from 1 nm to 20 cm. In another embodiment, the inorganic materials having the metal chalcogenide composition and the tubular-like geometry may have a length, i.e., greatest axis of the tubular-like geometry, that ranges from 5 nm to 15 cm. In yet another embodiment, the inorganic materials having the metal chalcogenide composition and the tubular-like geometry may have a length, i.e., greatest axis of the tubular-like geometry, that ranges from 100 nm to 10 cm. The inorganic materials having the metal chalcogenide composition and the tubular-like geometry may have a length or diameter that is any value within the above ranges. It is noted that the above dimensions are provided for illustrative purposes only and are not intended to limit the present disclosure.

In some embodiments, in addition to the fullerene like particles the grease composition may further include metal chalcogenide material having a sheet like geometry. In view of the dimensions of this material, the material may be referred to as a nanosheet. The material may also me referred to as a metal dichalcogenide monolayer. Metal dichalcogenide monolayers are atomically thin semiconductors of the type $MX_2$, with M a transition metal atom (Mo, W, etc.) and X a chalcogen atom (S, Se, or Te). One layer of M atoms is sandwiched between two layers of X atoms. For example, a $MoS_2$ monolayer can be only 6.5 Å thick.

Figure 7A:
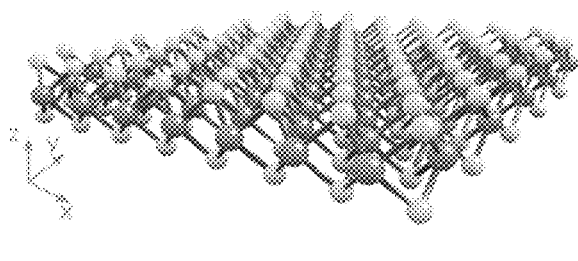
FIG. 7A is an illustration depicting a perspective of a nanosheet material of metal chalcogenide composition, in accordance with one embodiment of the present disclosure.
Figure 7B:
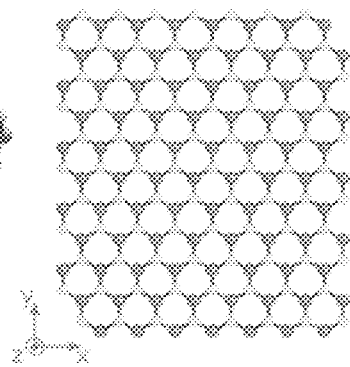
FIG. 7B is an illustration depicting a side cross-sectional view of a nanosheet material of a metal chalcogenide composition, in accordance with one embodiment of the present disclosure.
Figure 8:
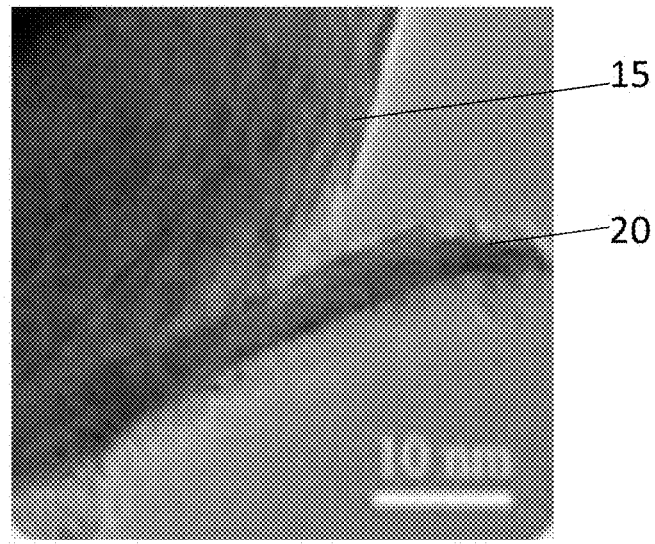
FIG. 8 is transmission electron microscope (TEM) image of a multi-layered nanosphere of metal chalcogenide having a molecular formula $MX_2$ with a fullerene-like geometry under a stress that exfoliates tribofilm lamellas that fill and re-smoothen damaged surfaces, in accordance with one embodiment of the present disclosure.
Figure 9:
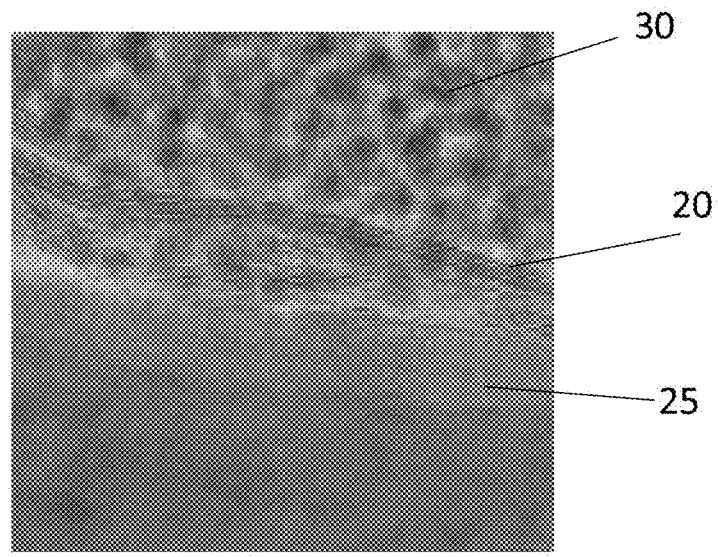
FIG. 9 is a transmission electron microscope (TEM) image of a surface coated with the tribofilm.

In some instances, it is similar to the geometry of a graphene sheet in that the material is one or two monolayers in dimension. However, different from the carbon-based graphene, the nanosheet material of the present disclosure is composed of a metal chalcogenide, such as molybdenum disulfide or tungsten disulfide. In one example, for a molybdenum disulfide ($MoS_2$) nanosheet, the crystal structure of molybdenum disulfide ($MoS_2$) takes the form of a hexagonal plane of sulfur (S) atoms on either side of a hexagonal plane of molybdenum (Mo) atoms. These triple planes stack on top of each other, with strong covalent bonds between the Mo and S atoms, but weak van der Waals forcing holding layers together. This allows them to be mechanically separated to form 2-dimensional sheets of $MoS_2$, as illustrated in FIGS. 7A and 7B. A tungsten disulfide ($WS_2$) monolayer has a similar geometry to that depicted in FIGS. 7A and 7B.

In some embodiments, the fullerene-like nano-structure is present in the grease composition as a dispersion of substantially non-agglomerated particles with diameter of less than 380 nm. The term "fullerene-like nano-structure" denotes that the fullerene-like nanoparticles used can be solely those have a sectioned outer layer, solely nanoparticles without a sectioned outer layer or a combination of nanoparticles including the sectioned outer layer and nanoparticles without the sectioned outer layer. The particles of the metal chalcogenide can be functionalized with at least one of non-anionic surfactants, anionic surfactants, cationic surfactants, zwitterionic surfactants, surfactants, silanes, thiols, polymers and dopants.

In some embodiments, the fullerene-like nano-structure is present in the grease composition as a dispersion of substantially non-agglomerated particles with diameter of less than 380 nm. The term "fullerene-like nano-structure" denotes that the fullerene-like nanoparticles used can be solely those have a sectioned outer layer, solely nanoparticles without a sectioned outer layer or a combination of nanoparticles including the sectioned outer layer and nanoparticles without the sectioned outer layer. The particles of the metal chalcogenide can be functionalized with at least one of non-anionic surfactants, anionic surfactants, cationic surfactants, zwitterionic surfactants, surfactants, silanes, thiols, polymers and dopants.

As will be described herein, the fullerene-like nanostructures are prepared in a liquid dispersion and then mixed with oil. The oil mixture is then treated with a soap to thicken the mixture to a grease. A "dispersion" is a system in which distributed particles, i.e., the fullerene-like nanostructures, of one material are dispersed in a continuous phase of another material, e.g., oil. The dispersed fullerene-like nano-structures, i.e., distributed particles, are substantially non-agglomerated. Agglomerates are particulate materials consisting of large particles formed by the joining or binding together of primary particles whose original identity can still be visible in the final agglomerate form. Agglomerates may also be referred to as flocs. It has been determined that prior methods of forming greases using nanoparticles in a solid form, such as a powder, results in particle sizes of 400 nm or greater, and agglomeration. As described herein, the methods of the present disclosure provide for non-agglomerated dispersed fullerene-like nano-structures throughout the continuous phase of the oil component of the grease, in which the particle size of the fullerene-like nano-structures is 380 nm or less.

The fullerene-like nanostructures, as well as the tubular like nanostructures and nanosheets, are an additive within the grease composition. Greases are generally manufactured by combining three components: base fluid (e.g., base oil), thickener, and additives. The base fluid can provide the largest component of the grease. For example, the base oil in some instances can represent 80-97% by weight of the grease. The choice of base fluid may be mineral oil, synthetic oil, or any fluid that provides lubricating properties. It is noted that the base oil portion of a grease performs at least a portion of the actual lubrication except in very slow or oscillating applications.

In some embodiments, the base fluid may be water based, oil based or can be an emulsion of water and oil. For example, the base fluid may be a synthetic oil, such as an ester, silicone, glycol, polybutene, and/or polyalphaolefins (PAO).

In one example, the base fluid is an oil selected from Group I, II, III, IV and V, as designated by the American Petroleum Institute (API). Group I base oils are classified as less than 90 percent saturates, greater than 0.03 percent sulfur (S) with a viscosity-index range of 80 to 120. In some embodiments, the temperature range for these oils is from 32 degrees F. to 150 degrees F. Group I base oils can be manufactured by solvent extraction, solvent or catalytic dewaxing, and hydro-finishing processes. Common Group I base oil may include 150SN (solvent neutral), 500SN, and 150BS (bright stock). Group I base oils are typically mineral oils.

Group II base oils are defined as being more than 90 percent saturates, less than 0.03 percent sulfur and with a viscosity index of 80 to 120. Group II base oils can be often manufactured by hydrocracking. Since all the hydrocarbon molecules of these oils are saturated, Group II base oils have better antioxidation properties than Group I base oils. Group II base oils are also typically mineral oils.

Group III base oils are defined as being greater than 90 percent saturates, less than 0.03 percent sulfur and have a viscosity index above 120. These oils are refined even more than Group II base oils and generally are hydrocracked with a higher pressure and heat than Group II. The processing for forming Group III base oils is typically longer than the processing for Group II base oils and are designed to achieve a purer base oil. Although typically made from crude oil, Group III base oils are sometimes described as synthesized hydrocarbons. Group III base oils can be manufactured by processes, such as isohydromerization, and can be manufactured from base oil or slack wax from dewaxing process.

Group IV base oils are polyalphaolefins (PAOs). These synthetic base oils are made through a process called synthesizing. More specifically, in some embodiments, the process may begin with oligomerisation of alpha olefins and a catalyst. Oligomerization is followed by distillation. The oligomerization and distillation steps may include steam cracking hydrocarbons to produce ultra-high-purity ethylene, ethylene oligomerization to develop 1-decene and 1-dodecene, and decene or dodecene oligomerization to form a mixture of dimers, trimers, tetramers and higher oligomers. Distillation is followed by hydrogenation including hydrogen and a catalyst. Group IV base oils such as polyalphaolefins (PAOs) are suitable for a broader temperature range that Group I, II and III base oils, and are applicable for use in extreme cold conditions and high heat applications. Group IV base oils typically have a viscosity index of at least 140.

Group V base oils are classified as all other base oils, including silicone, phosphate ester, polyalkylene glycol (PAG), polyester, bio-based fluids, naphthenic oil etc. Typical characteristics of the naphthenic oils are high degree of solvency and low pour point. Group V category of the oils could be used as single fluid or/and mixed with other base stocks, such as the aforementioned Group I, II, III and IV base oils in order to improve some functionalities or/and reduction of the cost of the final product. An example would be a mixture of naphthenic oil with polyalphaolefin (PAO), ester, vegetable oils, or paraffinic oils (Gr I, II, III) respectively.

In another embodiment, the base fluid, i.e., fluid medium, of the lubricant can be a bio-based fluid. Bio-based fluids can primarily be triglyceride esters derived from plants and animals. Examples of bio-based fluids that are suitable for the fluid component that is mixed with the intercalation compound of the metal chalcogenide having the molecular formula $MX_2$ include lanolin, whale oil, canola oil, castor oil, palm oil, sunflower seed oil, rapeseed oil and tall oil.

In one embodiment, the base fluid includes a naphthenic oil. The general formula is $C_nH_{2n}$. Naphthenic compounds are sometimes called naphthenes, cycloparaffins or hydrogenated benzenes. Naphtha is a refined petroleum fraction that contains a high percentage of these types of hydrocarbons. Naphthenic base oils have a very low aromatic content and a low paraffin (Wax) content. These characteristics allow for a low pour point on lighter viscosities and a high degree of solvency where heavier viscosities are required.

The grease composition also includes a thickener. The thickener may be any material that, in combination with the base fluid, e.g., base oil, will produce the solid to semi-fluid structure. Some examples of thickeners used in greases include lithium, aluminum, calcium soaps; clay; polyurea; either alone or in combination.

In some examples, the thickener may be an organic soap. The different types of soap thickeners include lithium 12-hydroxy stearate soaps, lithium stearate soaps, calcium soaps, sodium soaps and aluminum soaps. Simple metallic soaps are made by reacting the metallic alkali with a monobasic organic acid.

Lithium soaps, such as those used in lithium 12-hydroxy stearate greases, have good lubricity, shear stability, thermal resistance (as measured by the "dropping point", typically between 190-210° C.), and relatively low oil separation. Lithium greases can be used in various type applications such as automotive and industrial applications.

Greases prepared from calcium soaps can have improved water resistance over lithium greases and good shear stability. Calcium soap greases do not have good thermal resistance (dropping points range from 135-145° C.) and are typically only used in applications that operate up to 110° C. In one example, a calcium-based soap may be provided by calcium. In another example, a calcium-based soap may be provided by calcium sulfonate. In yet another example, a calcium-based soap may be a calcium sulfonate complex. Calcium sulfonate thickeners provide strong anti-wear properties, along with extreme pressure and corrosion resistance. They also possess excellent thermal stability with dropping points above 350° C. Calcium sulfonate greases have been used effectively in a wide range of both industries and applications, such as rolling equipment, pulp and paper industries, mining and construction, automotive, and the marine.

Sodium soap greases have high dropping points (typically 175° C.) but are generally limited to operating conditions not higher than 120° C. due to poor oxidative stability and high oil bleed. They also don't have good water resistance. Sodium soaps do provide good shear stability and lubricity.

Aluminum soaps have excellent oxidation resistance and good water resistance. However, in some embodiments, these greases have low thermal resistance (dropping point of only 110-115° C.) but users limit its operating conditions to less than 80° C. However, a typical aluminum complex grease has a dropping above 240° C. and a service temperature up to 150° C.

In some embodiments, the soap may be a mixed of at least two thickeners. The "mixed" characteristic is derived from mixing multiple metallic hydroxide compounds with a fatty acid. A common mixed soap is calcium (Ca)/lithium (Li) soap, which is made with calcium hydroxide and lithium hydroxide.

In some other embodiments, the thickener may be a complex soap. Like simple soaps, complex soaps use a single metallic hydroxide. In order to create the complex-thickened grease, a fatty acid is combined with a short chain complexing acid. The acid mixture is then combined with a metallic hydroxide to for a complex thickener. Lithium complex grease are typically made with lithium hydroxide, 12-HSA, and a second acid such as azelaic acid or sebacic acid or boric acid.

The thickener may also be provided by a non-organic soap type. Polyurea greases are generally found to be high-performance greases as they perform well in high temperatures, such as continuous use bearing applications. One of the main characteristics of polyurea thickened greases is their excellent antioxidant capability. Polyurea greases are characterized by dropping points in excess of 250° C. and low oil separation as measured by ASTM D6184. Some applications for polyurea greases are precision ball-bearings and electric motor bearings. Poly olefine-based thickener can be another example of the non-organic soap which could be based on polypropylene. This type of thickener system also offers high film thickness and excellent resistance to water and water-based chemicals, but then the maximum usage temperature is limited to about 130° C.

Silica greases resemble an aerogel. Silica greases yield excellent heat resistance and oxidative stability, the thickener is non-melting and therefore when tested for dropping point, does not give a value. The upper operating temperature of a silica grease gets determined by which base oil with which it is paired. Silica inherently has poor water resistance. However, it can be treated with various silanes to make it water resistant. Such factors are important for applications regarding an electrical connector and other damping applications.

Organo-clay greases, i.e., greases thickened using organo-clay soaps, are smooth textured and based on either bentonite, hectorite, or montmorillonite. In one example, the organo-clay soap can include bentonite clay. Greases including organo-clay thickeners have good heat resistance, since the thickener does not melt, and when tested for dropping point, do not give a value. They have good oxidative stability and are usable at least up to the temperature that the constituent oil evaporates. These greases also have water resistance. Clay greases have reasonable shear stability and tend to soften quite a bit when worked.

In yet another example, the thickener for the grease compositions of the present disclosure may include polytetrafluoroethylene (PTFE). PTFE greases are generally considered to be high-temperature greases that have good thermal stability, water resistance, shear stability as well as lubricity. PTFE greases typically have dropping points over 260° C. PTFE is generally used to thicken PFPE base oils which result in greases that can have low outgassing (release of a gas that was trapped within the grease) properties. PTFE thickened greases can be suitable for aerospace and electrical device, e.g., semiconductor, applications. Another advantage to PTFE/PFPE greases is that they have excellent material compatibility with plastics and elastomers.

In an even further example, could some mixtures of polyurea or/and poly olefine-based thickeners with soap based thickeners such as lithium, lithium complex etc. As in lubricating oil additives, grease additives and modifiers impart special properties or modify existing ones. The list of the additives and modifiers commonly used in lubricating greases could be long but some typical are; oxidation inhibitor, rust inhibitors, polymers, extreme pressure (EP) additives, anti-wear agents, lubricity or friction-reducing agents, electrical conductive agent, copper corrosion passivator, etc.

For example, boron containing compounds can be used as oxidation or rust inhibitors in greases. In some examples, the boron containing compositions may include refined borates, e.g., boric acid and/or boric oxide (anhydrous boric acid). Oxidation and/or rust inhibitors may be present in the grease composition in amounts as great as 1.0 wt. %. In some examples, the oxidation and/or rust inhibitors may be present in the grease composition in an amount ranging from 0.25 wt. % to 0.75 wt. %. In one example, the rust inhibitor is present in an amount equal to 0.5 wt. %.

The grease composition may also include an extreme pressure (EP) additive. In some of the slow, highly loaded, geared applications, there exists a lubricating condition that is typical for most failures due to adhesive wear. This condition is known as a boundary condition. In a boundary condition, there is no separation of the interacting surfaces. The function of an extreme pressure (EP) additive is to prevent this adhesive wear and protect the components when the lubricating grease can no longer provide the necessary film thickness. Extreme pressure additives are polar molecules, e.g., a molecule having a head and a tail, wherein the head of the molecule can be attracted to the metal surface, while the tail is compatible with the fluid carrier (oleophilic), e.g., the oil base of the disclosed industrial grease. As the conditions under which metal-to metal interactions become more severe due to higher temperatures and pressures (greater loads), the grease film becomes more stressed. The distance between the metal surfaces has decreased to the point where rubbing is occurring, and welding (adhesion) becomes highly likely. Temperature dependent EP additives can be activated by reacting with the metal surface when the temperatures are elevated due to the extreme pressure. The chemical reaction between the additive and metal surface is driven by the heat produced from friction. Some EP additives are temperature-dependent, while some EP additives are not. The most common temperature-dependent types include boron, chlorine, phosphorus and sulfur, which are suitable for use with some embodiments of the industrial greases disclosed herein.

The non-temperature-dependent EP additives, which are often based on sulfonate containing compositions, operate by a different mechanism that the temperature dependent EP additive compositions. A sulfonate is a salt or ester of a sulfonic acid and contains the functional group $R$—$SO_2O$—. Anions with the general formula $RSO_2O$— are called sulfonates. For example, the non-temperature-dependent EP additives may contain a colloidal carbonate salt dispersed within the sulfonate. During the interaction with iron, the colloidal carbonate forms a film that can act as a barrier between metal surfaces, much like the temperature-dependent; however, it does not need the elevated temperatures to start the reaction. Reactions with non-temperature-dependent EP additives may function at room temperature, e.g., 20° C. to 25° C. Both temperature dependent and non-temperature dependent EP additives are suitable for use with the industrial lubricants that are disclosed herein.

In some embodiments, the industrial lubricant also includes a phosphorus-based non-chlorine additive, such as a polar non-chlorine extreme pressure additive is a sulfur-based, or phosphorus-based derivative, or a combination of sulfur-based and phosphorus-based compounds that is polar and sterically small enough to interact with the metal surface of a work piece together with the oil base, e.g., methyl ester, as well as the intercalation compound.

The term "phosphorous-based polar non-chlorine extreme pressure additive" means a phosphorus-based derivative, such as phosphorus-based amine phosphates, including alkylamine or alkanolamine salts of phosphoric acid, butylamine phosphates, long chain alkyl amine phosphates, organophosphites, propanolamine phosphates, or other hydrocarbon amine phosphates, including triethanol, monoethanol, dibutyl, dimethyl, and monoisopropanol amine phosphates. The phosphorus-based derivative may be an ester including thioesters or amides of phosphorous containing acids. The organic moiety from which the phosphorous compound is derived may be an alkyl, alcohol, phenol, thiol, thiophenol or amine. The three organic residues of the phosphate compound may be one or more of these or combinations. Alkyl groups with 1 to 4 carbon compounds are suitable. A total carbon content of 2 to 12 carbon atoms is suitable. In some embodiments, the phosphorous based compound may be a phosphorous oxide, phosphide, phosphite, phosphate, pyrophosphate and thiophosphate The polar non-chlorine extreme pressure additive may be a sulfur-based derivative such as sulfurized fatty esters, sulfurized hydrocarbons, sulfurized triglycerides, alkyl polysulfides and combination The polar non-chlorine extreme pressure additive may be selected from the group consisting of Desilube 77, RheinChemie RC 8000 and RheinChemie RC2540, RheinChemie 2515, RheinChemie 2526, Lubrizol 5340L, Nonyl Polysulfide, Vanlube 672, Rhodia Lubrhophos LL-550, or EICO 670 or combinations. In some embodiments, the polar non-chlorine extreme pressure additive is an amine phosphate blend, such as the commercially available product, Desilube™ 77 Lubricant Additive by Desilube Technology, Inc., a mixture of organic amine salts of phosphoric and fatty acids.

In some embodiments, the composition of the grease provided herein may be composed of from about 2% to 30% polar non-chlorine extreme pressure additive. In some examples, the polar non-chlorine extreme pressure additive is in the amount of up to or about 0.5%, 1%, 2%, 3%, 5%, 10%, 15%, or 20% of the composition. In further examples, the polar no-chlorine extreme pressure additive may be present in an amount equal to 1%, 5%, 10%, 15%, 20%, 25%, and 30%, and any range including an upper limit value and a maximum limit value provided by any of the above examples. The ratio of the base oil to the polar non-chlorine extreme pressure additive is in the range of about 1:1.5 to about 48:1.

The grease composition may also include a tackifier, which is another type of additive. Tackifiers are additives that confer tack, or stringiness, to a substance and are typically used to provide adherence in fluid lubricants and stringiness in grease. Thickeners give additional body to greases and fluid lubricants. Both tackifiers and thickeners also provide drip resistance and serve to inhibit stray mist. Tackifiers can be resins (e.g., rosins and their derivates, terpenes and modified terpenes, aliphatic, cycloaliphatic and aromatic resins (C5 aliphatic resins, C9 aromatic resins, and C5/C9 aliphatic/aromatic resins), hydrogenated hydrocarbon resins, and their mixtures, terpene-phenol resins (TPR, used often with ethylene-vinyl acetate adhesives)), novolacs, etc. In some embodiments, the tackifier may be present in amounts as great as 1.25 wt. %. In some examples, the oxidation and/or rust inhibitors may be present in the grease composition in an amount ranging from 0.5 wt. % to 1.0 wt. %. In one example, the rust inhibitor is present in an amount equal to 0.75 wt. %.

In some embodiments, the additives employed in the grease composition may be pour point modifiers. Pour point depressants are polymers that allow oil and lubricants to flow at very low wintertime temperatures without heavy wax formation at these cold temperatures and enable the oil to remain pumpable (flowable). Some compounds used in pour point depressants include alkylated wax naphthalene, polymethacrylates, alkylated wax phenol and combinations thereof.

In some embodiments, the additives employed may be dropping point additives. Dropping point is an indicator of the heat resistance of grease. As grease temperature increases, penetration increases until the grease liquefies, and the desired consistency is lost. The dropping point is the temperature at which a grease becomes fluid enough to drip. The dropping point indicates the upper temperature limit at which a grease retains its structure, not the maximum temperature at which a grease may be used. In one embodiment, the dropping point additive is boron ester.

In one example, the grease composition may be a thickened with a lithium soap. For example, the grease may include lithium (Li) thickener (soap) in an amount ranging 5 wt. % to 15 wt. %; Naphthenic Oil in an amount ranging from 40 wt. % to 70 wt. %; a corrosion inhibitor in an amount on the order of 0.5 wt. %; a tackifier on the order of 0.75 wt. %; and inorganic fullerene tungsten disulfide (IFWS$_2$) nanoparticles in amounts ranging from 0.01 wt. % to 3 wt. %. It is noted that this is only one example of a grease composition, and other additives not specifically listed may also be present.

In another example, the grease composition may be thickened with calcium sulfonate soap. For example, the grease may include calcium sulfonate thickener in an amount ranging from 5 wt. to 20 wt. %; a Group 2 oil in an amount ranging from 40 wt. % to 80 wt. %; a tackifier in an amount ranging from 0.5 wt. % to 0.75 wt. %; and inorganic fullerene tungsten disulfide (IFWS$_2$) nanoparticles in amounts ranging from 0.01 wt. % to 4 wt. %.

In yet another example, the grease composition may be thickened with an aluminum complex soap. For example, the grease may include aluminum complex thickener in an amount ranging from 5 wt. % to 20 wt. %; a Group 2 oil in an amount ranging from 40 wt. % to 80 wt. %; a tackifier in an amount ranging from 0.5 wt. % to 0.75 wt. %; and inorganic fullerene tungsten disulfide (IFWS$_2$) nanoparticles in amounts ranging from 0.01 wt. % to 4 wt. %.

In an even further example, the grease composition may be thickened with a lithium soap in an amount ranging from 5 wt. % to 15 wt. %. In this example, the grease may include lithium soap thickener in an amount ranging from 5 wt. % to 15 wt. %; a Group 2 oil in an amount ranging from 40 wt. % to 80 wt. %; a tackifier in an amount ranging from 0.5 wt. % to 0.75 wt. %; and inorganic fullerene tungsten disulfide (IFWS$_2$) nanoparticles in amounts ranging from 0.01 wt. % to 4 wt. %.

The grease compositions and methods of forming grease compositions that are described herein, employ a dispersion of fullerene-like nano-structures, which can also include nanotubes of metal chalcogenides and monolayers (sheets) of metal chalcogenides. In some examples by employing a dispersion the particle size for the fullerene-like nano-structures (which can also include nanotubes of metal chalcogenides and monolayers (sheets) of metal chalcogenides) can be less than 400 nm. In some embodiments, by forming a liquid dispersion of the fullerene-like nano-structures (which can also include nanotubes of metal chalcogenides and monolayers (sheets) of metal chalcogenides) the fullerene-like nanostructures, nanotubes and monolayers may be non-agglomerated. By comparison, a grease formed by adding fullerene-nano-structures in powder form (e.g., dry powder form) will agglomerate, and those agglomerates/aggregates have a particle size greater than 400 nm.

The method for forming the grease can include blending a metallic soap with an oil-based medium to provide a grease. The metallic soap is a thickener, and can be a lithium-based thickener, calcium based thickener, a calcium sulfonate complex, lithium calcium based thickener, bentonite clay based thickener, urea thickener, PTFT thickener, aluminum complex type thickener or combinations thereof. The oil-based medium may be any of the aforementioned examples for the grease composition. In some embodiments, the oil-based medium is an oil composition selected from the group consisting of Group I lubricants, Group II lubricants, Group III, IV, and V lubricants, synthetic oils, mineral oils, bio-lubricants and combinations thereof. In one example, the oil-based medium comprises naphthenic oil. It is noted that any of the above-mentioned thickeners and liquid bases mediums that are described above in describing the grease composition may be employed in methods for creating the grease composition.

In some embodiments, the method may begin with preheating the mixing tank, e.g., vessel. For example, when forming a lithium type grease (or other similar grease) the mixing tank may be preheated to a temperature ranging from 185° C. to 240° C. In one example, the mixing tank may be preheated to 200° C. The oil-based medium may then be added to the tank. For example, when forming a lithium type grease (or other similar grease) the oil-based medium may be naphthenic or paraffinic or other like oil, wherein the amount selected provides that the oil based medium is present in the final grease composition in an amount approximate to 40 wt. %.

In some embodiments, to provide a lithium type grease, the oil-based medium may be further mixed with 12Hydroxy stearic acid in an amount ranging from 5.7 wt. % to 6 wt. %, naphthenic acid in an amount ranging from 0.15 wt. % to 0.25 wt. %, and an antioxidant in amounts ranging from 0.5 wt. % to 1.2 wt. %.

In some embodiments, following the formation of the above-described mixture including the oil-based medium, the thickener may be added, e.g., added to the mixing tank including the mixture of the oil based medium. In one example, in the case of lithium type grease, lithium hydroxide may be added in an amount ranging from 0.7 wt. % to 1.5 wt. %.

In some embodiments, following the addition of the thickener, water may be added in an amount ranging from 0.15 wt. % to 0.4 wt. %.

In some embodiments, following the addition of the water, the mixing tank may be sealed, and the pressure may be allowed to build, maintaining it between about 60 psi and about 70 psi.

In some embodiments, after the grease is cooked, additional oil (e.g., different types) may be added. The grease may then be allowed to start to cool.

As temperature, dropped below 100° C., other additives and oils may be added to meet specifications (antioxidants, anti-wear, friction modifiers, tackifiers, extreme pressure additives, etc.)

For example, the fullerene-like nano-structures (which can also include nanotubes of metal chalcogenides and monolayers (sheets) of metal chalcogenides) can then be added to the grease. In one embodiment, the method of forming the grease can include forming a liquid dispersion containing a fullerene-like nano-structure comprising a plurality of layers each comprised of a metal chalcogenide composition that has a molecular formula of $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. The liquid dispersion containing the fullerene-like nano-structures (which can also include nanotubes of metal chalcogenides and monolayers (sheets) of metal chalcogenides) may then be mixed with the grease. In some examples, the metal chalcogenide is $MoS_2$ or $WS_2$.

This can provide that the fullerene-like nano-structures are present in the grease as a dispersed phase that is substantially non-agglomerated particles with diameter of less than 380 nm. In some embodiments, the diameter of the substantially non-agglomerated particles ranges from 10 nm to 300 nm.

In some embodiments, to provide that the fullerene-like nanostructures are dispersed throughout the grease in a dispersion of non-agglomerated nanoparticles, the surface of the inorganic fullerene-like (with and/or without a sectioned outer layer) and/or tube-like having the molecular formula $MX_2$ is functionalized or modified in order to obtain their homogeneous dispersion in the fluid medium of the lubricant, prevent particles agglomeration and settling. A "dispersion" is a system of two phases, in which discrete particles, i.e., primary particles, such as the inorganic fullerene-like (with and/or without a sectioned outer layer) and/or tube-like having the molecular formula $MX_2$, provide a first phase that are distributed in the other second phase, in which the second phase is a substantially continuous phase (dispersion medium) differing from the dispersed phase in composition. Dispersions are homogeneous when the ratio of solute, i.e., primary particles, such as the inorganic fullerene-like (with and/or without a sectioned outer layer) and/or tube-like having the molecular formula $MX_2$, to solvent, i.e., fluid medium, remains the same throughout the solution even if homogenized with multiple sources, and stable because, the solute will not settle out. This type of mixture, which is provided by the methods and compositions disclosed herein, is very stable, i.e., its particles do not settle, or separate. As used herein, "agglomeration" means an association of primary particles, which can range from relatively weak (based upon, for example, charge or polarity) to relatively strong (based upon, for example, chemical bonding). When the primary particles, i.e., inorganic fullerene-like (with and/or without a sectioned outer layer) and/or tube-like having the molecular formula $MX_2$, agglomerate they can fall, i.e., settle, from suspension. The dispersions are stabilized from agglomeration or settling by the functionalization agents that is described below, and the particle size that is provided by mechanical downgrading, such as particle size reductions provided by milling and/or high-pressure homogenization and/or high shear mixing and/or ultrasonic mixing and/or a combination thereof.

In some embodiments, the liquid dispersion of nanoparticles that is added to the grease composition includes the nanoparticles (tungsten chalcogenide, e.g., $MoS_2$ and/or $WS_2$, fullerene-like nano-structures, nanosheets, tube like nanoparticles), a liquid medium (liquid carrier), such as an oil-based medium, and a functionalizing agent. The nanoparticles may be present in the liquid dispersion in an amount ranging from 1% to 70%. In another example, the nanoparticles may be present in the liquid dispersion in an amount ranging from 10% to 60%.

The liquid carrier can be oil based, water based or can be an emulsion of water and oil. For example, the base fluid may be a synthetic oil, such as an ester, silicone, glycol, polybutene, and/or polyalphaolefins (PAO). In one example, the liquid carrier is an oil selected from Group I, II, III, IV and V, as designated by the American Petroleum Institute (API). These elements have all been described above.

The surface of the inorganic fullerene-like (with and/or without a sectioned outer layer) and/or tube-like particles having the molecular formula $MX_2$ may be functionalized or modified by forming an adsorption-solvate protective layer on the particle surfaces, i.e., surface of the inorganic fullerene-like (with and/or without a sectioned outer layer) and/or tube-like particles having the molecular formula $MX_2$, and preventing the close approach and coagulation of particles under the action of short-range forces of molecular attraction. The close approach of particles may be impeded by the disjoining pressure of the liquid dispersion medium, which is solvated by molecules or ions of the stabilizer in the adsorption layer, by electrostatic repulsion of like-charged ions adsorbed on the particle surfaces, or by enhanced structural viscosity of the surface protective layer, which can also be referred to as being a structural-mechanical barrier.

Surface functionalization for the surface of the inorganic fullerene-like (with and/or without a sectioned outer layer) and/or tube-like particles having the molecular formula $MX_2$ may be provided by functionalizing agents that include silanes, thiols, ionic, anionic, cationic, nonionic surfactants, amine based dispersant and surfactants, succinimide groups, fatty acids, acrylic polymers, copolymers, polymers, monomers and combinations thereof.

In some embodiments, the functionalizing agents can be described as comprising a headgroup (a part that interacts primarily with the surface of the inorganic fullerene-like (with and/or without a sectioned outer layer) and/or tube-like particles having the molecular formula $MX_2$) and a tailgroup (a part that interacts with the solvent, i.e., fluid medium). For example, the headgroup of the functionalizing agent may interact with the sectioned portion 2 of the outer layer of the fullerene like particle that is depicted in FIG. 5. Useful headgroups include those that comprise alkoxy, hydroxyl, halo, thiol, silanol, amino, ammonium, phosphate, phosphonate, phosphonic acid, phosphinate, phosphinic acid, phosphine oxide, sulfate, sulfonate, sulfonic acid, sulfinate, carboxylate, carboxylic acid, carbonate, boronate, stannate, hydroxamic acid, and/or like moieties. Multiple headgroups can extend from the same tailgroup, as in the case of 2-dodecylsuccinic acid and (1-aminooctyl) phosphonic acid. Useful hydrophobic and/or hydrophilic tailgroups include those that comprise single or multiplealkyl, aryl, cycloalkyl, cycloalkenyl, haloalkyl, oligo-ethylene glycol, oligo-ethyleneimine, dialkyl ether, dialkyl thioether, aminoalkyl, and/or like moieties. Multiple tailgroups can extend from the same headgroup, as in the case of trioctylphosphine oxide.

Examples of silanes that are suitable for use as functionalizing agents with the inorganic fullerene-like (with and/or without a sectioned outer layer) and/or tube-like particles having the molecular formula $MX_2$ and the fluid medium of the present disclosure include organosilanes including, e.g., alkylchlorosilanes, alkoxysilanes, e.g., methyltrimethoxysilane, methyltriethoxysilane, ethyltrimethoxysilane, ethyltriethoxysilane, n-propyltrimethoxysilane, n-propyltriethoxysilane, i-propyltrimethoxysilane, ipropyltriethoxysilane, butyltrimethoxysilane, butyltriethoxysilane, hexyltrimethoxysilane, octyltrimethoxysilane, 3-mercaptopropyltrimethoxysilane, n-octyltriethoxysilane, phenyltriethoxysilane, polytriethoxysilane, vinyltrimethoxysilane, vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri(t-butoxy)silane, vinyltris(isobutoxy)silane, vinyltris (isopropenoxy) silane, and vinyltris (2-methoxyethoxy) silane; trialkoxyarylsilanes; isooctyltrimethoxy-silane; N-(3-triethoxysilylpropy-1) methoxyethoxyethoxy ethyl carbamate; N-(3-triethoxysilylpropyl) methoxyethoxyethoxyethyl carbamate; silane functional (meth)acrylates including, e.g., 3-(methacryloyloxy) propyltrimethoxysilane, 3-acryloyloxypropyltrimethoxysilane, 3-(methacryloyloxy) propyltriethoxysi-lane, 3-(methacryloyloxy)propylmethyldimethoxysilane, 3-(acryloyloxypropyl) methyldimethoxysilane, 3-(methacryloyloxy) propyldime-thylethoxysilane, 3-(methacryloyloxy) methyltriethoxysilane, 3-(methacryloyloxy) methyltrimethoxysilane, 3-(methacryloyloxy) propyldimet-hylethoxysilane, 3-methacryloyloxy) propenyltrimethoxysilane, and 3-(methacryloyloxy) propyltrimethoxysilane; polydialkylsiloxanes including, e.g., polydimethylsiloxane, arylsilanes including, e.g., substituted and unsubstituted arylsilanes, alkylsilanes including, e.g., substituted and unsubstituted alkyl silanes including, e.g., methoxy and hydroxy substituted alkyl silanes, and combinations thereof.

Examples of amines that are suitable for use as functionalizing agents with the inorganic fullerene-like (with and/or without a sectioned outer layer) and/or tube-like particles having the molecular formula $MX_2$ and the fluid medium of the present disclosure include alkylamines including, e.g., octylamine, oleylamine, decylamine, dodecylamine, octadecylamine, monopolyethylene glycol amines, and combinations thereof.

Useful organic acid functionalizing agents include, e.g., oxyacids of carbon (e.g., carboxylic acid), sulfur and phosphorus, and combinations thereof.

Representative examples of polar functionalizing agents having carboxylic acid functionality include $CH_3O(CH_2CH_2O)_2C-H_2COOH$ (hereafter MEEAA) and 2-(2-methoxyethoxy) acetic acid having the chemical structure $CH_3OCH_2CH_2OCH_2COOH$ hereafter MEAA) and mono (polyethylene glycol) succinate in either acid or salt forms.

Representative examples of non-polar functionalizing agents having carboxylic acid functionality include octanoic acid, dodecanoic acid and oleic acid.

Examples of suitable phosphorus containing acids that are suitable as functionalizing agents include phosphonic acids including, e.g., octylphosphonic acid, laurylphosphonic acid, decylphosphonic acid, dodecylphosphonic acid, octadecylphosphonic acid, and monopolyethylene glycol phosphonate in either acid or salt forms.

Examples of other useful functionalizing agents include acrylic acid, methacrylic acid, beta-carboxyethyl acrylate, mono-2-(methacryloyloxyethyl) succinate, and combinations thereof. A useful surface modifying agent is mono (methacryloyloxypolyethyleneglycol-) succinate.

Examples of suitable alcohols for functionalizing agents include, e.g., aliphatic alcohols including, e.g., octadecyl, dodecyl, lauryl and furfuryl alcohol, alicyclic alcohols including, e.g., cyclohexanol, and aromatic alcohols including, e.g., phenol and benzyl alcohol, and combinations thereof.

In some embodiments, the functionalizing agents may be introduced to the inorganic fullerene-like (with and/or without a sectioned outer layer) and/or tube-like particles having the molecular formula $MX_2$ during their formation prior to having the opportunity to agglomerate or destabilize from solution. In other embodiments, agglomerates of the inorganic fullerene-like (with and/or without a sectioned outer layer) and/or tube-like particles having the molecular formula $MX_2$ are first mechanically broken down into their primary size, i.e., the size of the primary particles prior to agglomeration. The mechanical reduction of the agglomerates of the inorganic fullerene-like and/or tube-like particles having the molecular formula $MX_2$ to their primary size may be referred to as milling.

In some embodiment's inorganic fullerene nanoparticles (with and/or without a sectioned outer layer) can be mixed with other solid particles, which may be from 1 nm to 380 nm in size, such as carbon fullerenes, carbon nanotubes, graphite, $2H-MoS_2$, $2H-WS_2$, boron, Zn, Cu, silver, graphite, MgOH, carbon diamond or combinations of thereof.

In some embodiments, the milling process may begin with agglomerates having a particle size ranging from 5 microns to 20 microns. The particles size of the agglomerates may be reduced using a high-shear mixer, two or three roll mixers, homogenizers, bead mills, ultrasonic pulverizer and a combination thereof. A high-shear mixer disperses, or transports, one phase or ingredient (liquid, solid, gas) into a main continuous phase (liquid), with which it would normally be immiscible. A rotor or impellor, together with a stationary component known as a stator, or an array of rotors and stators, is used either in a tank containing the solution to be mixed, or in a pipe through which the solution passes, to create shear. In some embodiments, the high shear mixer may be a batch high-shear mixer, an inline powder induction, a high-shear granulator, an ultra-high-shear inline mixers and a combinations thereof.

Other means for reducing the particle size of the agglomerates to the primary particle size of the inorganic fullerene-like (with and/or without a sectioned outer layer) and/or tube-like particles having the molecular formula $MX_2$ include an attritor, agitator, ball mill, bead mill, basket mill, colloid mill, high speed disperser, edge runner, jar mill, low speed paddle mixer, variable speed mixer, paste mixer, ribbon blender, pug mixer, nauta mixer, sand/perl mill, triple roll mill, two roll mill, planetary mixer, slow speed mixer, high speed mixer, twin shaft mixer, multi shaft mixer, sigma kneader, rotor-stator mixer, homogenizer/emulsifier, high shear mixer, conical blender, V-blender, double cone blender, suspended mixer and combinations thereof. The particle size of the agglomerates may also be reduced using a sonicator. The mixing may be performed at room temperature or at an elevated temperature. The reduction of the size of agglomerates by milling is distinguished from the milling of the nanoparticles themselves to provide that the nanoparticles have dimensions within the nanoscale realm.

In some embodiments, the fluid medium for the lubricant is mixed with the inorganic fullerene-like (with and/or without a sectioned outer layer) and/or tube-like particles having the molecular formula $MX_2$ during the milling step in which the agglomerates of the inorganic fullerene-like (with and/or without a sectioned outer layer) and/or tube-like particles having the molecular formula $MX_2$ are mechanically broken down into their primary size. The inorganic fullerene-like (with and/or without a sectioned outer layer) and/or tube-like particles having the molecular formula $MX_2$ may be mixed with the fluid medium in an amount ranging from 0.1% to 60% by volume. In another embodiment, the inorganic fullerene-like (with and/or without a sectioned outer layer) and/or tube-like particles having the molecular formula $MX_2$ may be mixed with the fluid medium in an amount ranging from 0.5% to 40% by volume. In yet another embodiment, the inorganic fullerene-like (with and/or without a sectioned outer layer) and/or tube-like particles having the molecular formula $MX_2$ may be mixed with the fluid medium in an amount ranging from 0.5% to 20% by volume.

In some embodiments, the agglomerates of the inorganic fullerene-like (with and/or without a sectioned outer layer) and/or tube-like particles having the molecular formula $MX_2$ is reduced during the milling step to a diameter ranging from 1 nm to 380 nm for fullerene like geometries. In another embodiment, the agglomerates of the inorganic fullerene-like and/or tube-like particles having the molecular formula $MX_2$ is reduced during the milling step to a diameter ranging from 20 nm to 300 nm for fullerene like geometries. It is noted that the above dimensions are provided for illustrative purposes only and are not intended to limit the present disclosure.

In some embodiments, once the agglomerates of the inorganic fullerene-like (with and/or without a sectioned outer layer) and/or tube-like particles having the molecular formula $MX_2$ are broken down into their primary size, the functionalizing agent may be added to the mixture of the fluid medium and the inorganic fullerene-like and/or tube-like particles having the molecular formula $MX_2$.

A functionalizing agent of amine may be added to the mixture in an amount ranging from 0.1 wt % to 50 wt. % of the inorganic fullerene-like (with and/or without a sectioned outer layer) and/or tube-like particles. For example, when functionalizing agent is an amine, such as oleylamine, the minimum functionalizing agent would be 0.1 g for 1 gram of inorganic fullerene-like (with and/or without a sectioned outer layer) band/or tube-like particles having the molecular formula $MX_2$, e.g. 1 gram of fullerene-like tungsten disulfide ($WS_2$), in 100 grams of the fluid medium, e.g., an olefin based oil. For example, for 100 grams of isomerized alpha olefin fluid (drilling fluid) 1 wt % i.e. 1 gram of $WS_2$ fullerene-like (with and/or without a sectioned outer layer) particles and 0.1 gram of oleylamine are added). In another example, when functionalizing agent is an amine, such as oleylamine, the maximum functionalizing agent would be 20 grams for 1 gram of inorganic fullerene-like (with and/or without a sectioned outer layer) and/or tube-like particles having the molecular formula $MX_2$, e.g. 1 gram of fullerene-like tungsten disulfide ($WS_2$) or molybdenum disulfide ($MoS_2$), in 100 grams of the fluid medium, e.g., an olefin based oil.

A functionalizing agent of silane may be added to the mixture in an amount ranging from 0.1 wt % to 50 wt. % of the inorganic fullerene-like and/or tube-like particles. For example, when functionalizing agent is a silane, e.g., octadecyltrichlorosilane (OTS), the minimum functionalizing agent would be 0.1 g for 1 gram of inorganic fullerene-like (with and/or without a sectioned outer layer) and/or tube-like particles having the molecular formula $MX_2$, e.g., 1 gram of fullerene-like tungsten disulfide ($WS_2$), in 100 grams of the fluid medium, e.g., an olefin-based oil. In another example, when functionalizing agent is a silane, e.g., octadecyltrichlorosilane (OTS), the maximum functionalizing agent would be 50 grams for 1 gram of inorganic fullerene-like and/or tube-like particles having the molecular formula $MX_2$, e.g. 1 gram of fullerene-like tungsten disulfide ($WS_2$), in 100 grams of the fluid medium, e.g., an olefin based oil.

In some embodiments, the functionalizing agent and the liquid carrier are first mixed and then the nanoparticles are added. However, as noted above the functionalizing agent may be applied as the nanoparticles are processed to their appropriate size, wherein thereafter additional liquid carrier is then added to provide the mixture that is added to the grease composition as an additive.

The functionalizing agent applied to the mixture of the fluid medium and the inorganic fullerene-like (with and/or without a sectioned outer layer) and/or tube-like particles having the molecular formula $MX_2$ to provide the additive of nanoparticles in liquid carrier provides that the nanoparticles do not agglomerate or settle for a period of time that may range from 3 hours to 5 years. In another embodiment, the functionalizing agent applied to the mixture of the fluid medium and the inorganic fullerene-like (with and/or without a sectioned outer layer) and/or tube-like particles having the molecular formula $MX_2$ provide dispersions that do not agglomerate or settle for a period of time that may range from 5 hours to 3 years. In yet another embodiment, the functionalizing agent applied to the mixture of the fluid medium and the inorganic fullerene-like and/or tube-like particles having the molecular formula $MX_2$ provide dispersions that do not agglomerate or settle for a period of time that may range from 24 hours to 1 year.

As noted above, as the temperature of the grease cools, e.g., drops below 100° C., the liquid dispersion containing the fullerene-like nano-structures (which can also include nanotubes of metal chalcogenides and monolayers (sheets) of metal chalcogenides) may then be mixed with the grease. Mixing the liquid dispersion with the grease, disperses the fullerene-like nanostructures throughout the grease composition. The particle size remains at less than 380 nm, which is less than particle sizes for grease including metal chalcogenide-based additives that are mixed with the grease in powder form. In some other examples, the diameter of the substantially non-agglomerated particles ranges from 10 nm to 300 nm throughout the grease in a dispersion.

Figure 10:
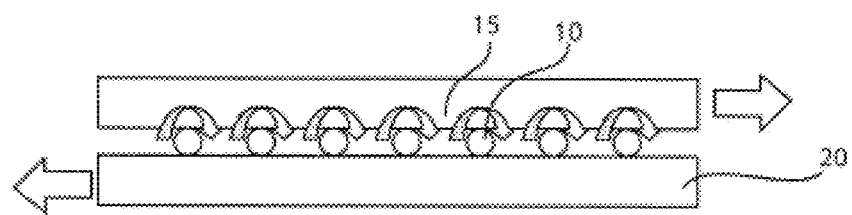
FIG. 10 is a pictorial view depicting an intercalation compound that is in simultaneous contact with two surfaces being lubricated by a rolling action of the intercalation compound, in accordance with one embodiment of the present disclosure.

FIG. 10 depicts the application of the grease including the inorganic fullerene-like (with and/or without a sectioned outer layer) and/or tube-like particles having the molecular formula $MX_2$ and the functionalizing agent to a surface to be lubricated. FIG. 10 depicts how the sphere geometry of the inorganic fullerene-like particles (with and/or without a sectioned outer layer) 10 having the molecular formula $MX_2$ provide roller effect when simultaneously in contract with opposing surfaces 15, 20 that are being lubricated. More specifically, the rolling action of the sphere geometry of the inorganic fullerene-like particles 10 provides a low friction sliding motion between the opposing surfaces 15, 20 being lubricated. The sphere geometry of the inorganic fullerene-like particles 10 (with and/or without a sectioned outer layer) acts as an anti-friction agent enhancing the effectiveness of the fluid lubricant. The column shape of the tube-like particles having the molecular formula $MX_2$ provide a roller effect similar to the performance that is provided by the sphere geometry of the inorganic fullerene-like particles 10.

Figure 11:
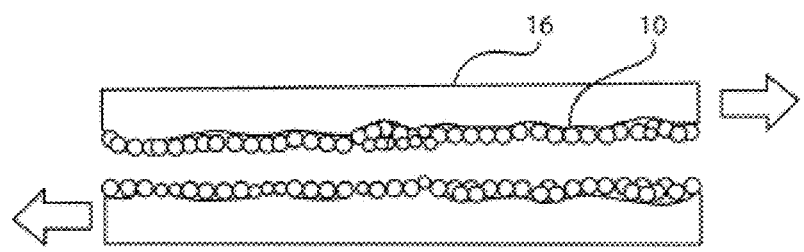
FIG. 11 is a pictorial view depicting an intercalation compound that is in simultaneous contact with two surfaces being lubricated by a rolling action of the intercalation compound, in accordance with another embodiment of the present disclosure.
Figure 12:
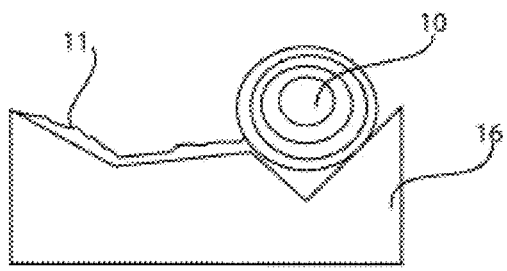
FIG. 12 is a pictorial view depicting a layer of the intercalation compound adhering to a surface that is being lubricated by the intercalation compound, in accordance with one embodiment of the present disclosure.

FIGS. 11 and 12 further depict a surface reconditioning effect that is provided by the grease containing the inorganic fullerene-like (with and/or without a sectioned outer layer)

and/or tube-like particles 10 having the molecular formula $MX_2$ and the functionalizing agent. More specifically, the inorganic fullerene-like (with and/or without a sectioned outer layer) and/or tube-like particles 10 having the molecular formula $MX_2$ are layered structures, in which when the exterior layers contact the surface being lubricated, the exterior layer 11 peels (also referred to as exfoliates) from the inorganic fullerene-like and/or tube-like particles and adheres to the surface 16 being lubricated, as depicted in FIG. 12. An inorganic fullerene-like and/or tube-like particle of tungsten disulfide ($WS_2$) may have alternating layers of tungsten (W) and sulfur (S). An inorganic fullerene-like (with and/or without a sectioned outer layer) and/or tube-like particle of molybdenum disulfide ($MoS_2$) may have alternating layers of molybdenum (Mo) and sulfur (S). One molybdenum (Mo) atom is sandwiched between two hexagonally packed sulfur atoms. The bonding between Mo and two S is covalent, however the bonding between each $MoS_2$ sandwich is week (Vander Waals). In this manner, the inorganic fullerene-like and/or tube-like particles having the molecular formula $MX_2$, such as molybdenum disulfide ($MoS_2$) and tungsten disulfide ($WS_2$), can deposit a metal-chalcogen (metal-sulfide for example) layer, such as molybdenum ($MoS_2$) or tungsten ($WS_2$), on the eroded surface being lubricated. Therefore, the inorganic fullerene-like and/or tube-like particle can recondition eroded surfaces, i.e., smooth rough and damaged surfaces, and lubricate to protect from additional wear. In some embodiments, the hollow feature of the inorganic fullerene-like and/or tube-like particle provides enhanced impact resistance.

In some embodiments, the grease may further include a carbon containing nanomaterial, such as carbon nanotubes, e.g., single wall carbon nanotubes (CNT) or multi-wall carbon nanotubes (SWNT), or graphitic materials, such as carbon black (CB), graphitic fibers, graphite platelets and diamond like carbon (DLC). In one embodiment, the carbon containing nanomaterial is provided by carbon nanotubes that may have a high purity on the order of about 95% to about 99% carbon. In an even further embodiment, the carbon nanotubes have a high purity on the order of about 99% or greater. In one embodiment, the carbon nanotubes may be provided by laser vaporization. In one embodiment, the single wall carbon nanotubes are formed using laser vaporization in combination with a catalyst, such as a metal catalyst. In one embodiment, the catalyst is supported on a substrate, such as a graphite substrate, or the catalyst may be floating metal catalyst particles. In one embodiment, the metal catalyst may be composed of Fe, Ni, Co, Rh, Y or alloys and combinations thereof.

The diameter of a single wall carbon nanotube may range from about 1 nanometer to about 50 nanometers. In another embodiment, the diameter of a single wall carbon nanotube may range from about 1.2 nanometers to about 1.6 nanometers. In one embodiment, the nanotubes used in accordance with the present invention have an aspect ratio of length to diameter on the order of approximately 200:1.

The carbon nanotubes comprise a majority of carbon typically being of high purity. In other examples, the carbon nanotubes include a carbon content ranging from being greater than 50%, wherein a purification process is utilized to provide carbon nanotubes having of high purity, such as greater than 90% carbon. In one embodiment, the carbon nanotubes may be purified by a process that includes an acid treatment followed by an oxidation. In one embodiment, the acid treatment may include treatment and oxidation steps are provided by a dilute $HNO_3$ reflux/air oxidation procedure.

Other methods of forming the carbon nanotubes may also be employed, such as chemical vapor deposition (CVD). In another embodiment, the carbon nanotubes may be multi-walled. Carbon black (also known as acetylene black, channel black, furnace black, lamp black or thermal black) is also suitable for providing the at least one carbon containing nanomaterial that is present in the lubricant. Carbon black is a material produced by the incomplete combustion of heavy petroleum products such as FCC tar, coal tar, ethylene cracking tar, and a small amount from vegetable oil.

In some embodiments, the carbon containing nanomaterial may be present in the lubricant in an amount ranging from 0.1 wt % to 50 wt. %. In another embodiment, the carbon containing nanomaterial may be present in the lubricant in an amount ranging from 0.1 wt % to 40 wt. %. In yet another embodiment, the carbon containing nanomaterial in the lubricant in an amount ranging from 0.1 wt % to 25 wt. %.

In some applications, the above-described grease may be suitable for lubricating treatment for industrial, automotive, transportation, and generator applications. For example, the grease may be suitable for gasoline and diesel engines used in cars, trucks, industrial engines, boats and motorcycles. Other automotive applications for the above-described grease include gears, transmissions, e.g., manual and automatic transmissions, rear and front differentials, transfer cases, such as those used in 4×4 vehicles and trucks, and final drive apparatus, such as those used in tractors and earth moving equipment. Industrial applications include gears, chains, conveyors, bearings and sliding components.

The following experimental results section is provided to further elaborate on some embodiments of the present disclosure. More specifically, the following experimental results are directed to greases thickened with lithium soap, and complex lithium soap, in which the base oil is a naphthenic oil. It is noted that the following experimental results are not intended to limit the broader teachings provided above, which are not directed to lithium and/or naphthenic compositions.

EXPERIMENTAL RESULTS

Grease compositions were prepared using including inorganic fullerene like nanoparticles, as described above.

Example 1, samples 1(a), 1(b) and 1(c) were prepared as lithium grease (e.g., simple soap lithium greases, which result from the reaction of one fatty acid and a metallic hydroxide). In sample 1(a) of Example 1, the base fluid was naphthenic oil. Sample 1(a) included 5% thickener, and 95% base fluid. Sample 1(b) of example 1 included 1 wt. % molybdenum disulfide having a fullerene like geometry and nanoparticle size (hereafter referred to as $MoS_2$ IF-nanoparticles). The $MoS_2$ IF-nanoparticles were provided in powder form having a diameter ranging from 1.5 μm to 2 μm.

Sample 1(c) example 1 included 1 wt. % tungsten disulfide having a fullerene like geometry and nanoparticle size (hereafter referred to as $WS_2$ IF-nanoparticles). The $WS_2$ IF-nanoparticles had a particle size of 50 nm to 180 nm.

The samples were prepared by mixing and homogenizing with a high-speed mixer at a time of approximately 8 minutes at approximately 3200 rpm.

Following the preparation of Samples 1(a), 1(b) and 1(c), the samples were measured for viscosity (ASTM D 445) and tested for weld load (ASTM D2596), wear scaring (ASTM D2266) and Friction Coefficient (D2266). The measured values are including in TABLE 1, as follows:

TABLE 1

Example 1: LITHIUM GREASE

| Specification | Unit | Method ASTM | Sample 1(a) (SA1(a)) Neat Grease | Sample (1(b) (SA1(b)) Neat Grease + 1% MOS$_2$ | Sample 1(c) (SA1(c)) Neat Grease + 1% WS$_2$ |
|---|---|---|---|---|---|
| Base Fluid-Type | | | Naphthenic Oil | Naphthenic Oil | Naphthenic Oil |
| Viscosity of the Oil @ 40° C. | mm$^2$/s | D 445 | 600 | 600 | 600 |
| NLGI grade | | D 217 | 2 | 2 | 2 |
| Dropping Point | ° C. | IP 396 | 197.5 | | |
| 4-ball; weld load | Kg f | D 2596 | 160 | 200 | 315 |
| 4-ball; wear scar | mm | D 2266 | 0.700 | 0.840 | 0.345 |
| 4-ball Friction Coefficient | | D 2266 | 0.0879 | 0.0926 | 0.0724 |

Example 2, samples 2(a), 2(b) and 2(c) were prepared as lithium grease (e.g., simple soap lithium greases, which result from the reaction of one fatty acid and a metallic hydroxide). In sample 2(a) of Example 2, the base fluid was naphthenic oil mixed with a group II paraffinic oil (Naphthenic Oil+Gr II). Group II base oils are defined as being more than 90 percent saturates, less than 0.03 percent sulfur and with a viscosity index of 80 to 120. Group II base oils are generally hydrotreated. Sample 2(a) included 6.75% thickener, and 46.60% naphthenic base fluid, as well as 46.65% group II paraffinic oil. Sample 2(b) of example 2 included 1 wt. % molybdenum disulfide having a fullerene like geometry and nanoparticle size (hereafter referred to as MoS$_2$ IF-nanoparticles) to the same base fluid that was measured as sample 2(a). The MoS$_2$ IF-nanoparticles were provided in powder form having a diameter ranging from 1.5 µm to 2 µm. Sample 2(c) of example 2 included 1 wt. % tungsten disulfide having a fullerene like geometry and nanoparticle size (hereafter referred to as WS$_2$ IF-nanoparticles). The WS$_2$ IF-nanoparticles had a particle size of 50 nm to 180 nm.

Following the preparation of Samples 2(a), 2(b) and 2(c), the samples were measured for viscosity (ASTM D 445) and tested for weld load (ASTM D2596), wear scaring (ASTM D2266) and Friction Coefficient (D2266). The measured values are including in TABLE 2, as follows:

Example 3, samples 3(a), 3(b) and (c) were prepared as lithium grease (e.g., simple soap lithium greases, which result from the reaction of one fatty acid and a metallic hydroxide). In sample 3(a) of Example 3, the base fluid was naphthenic oil mixed with a group II paraffinic oil (Naphthenic Oil+Gr II). Sample 3(a) included 3.50% thickener, and 48.30 naphthenic base fluid, as well as 48.20 group II paraffinic oil.

Sample 3(b) of example 3 included 1 wt. % molybdenum disulfide having a fullerene like geometry and nanoparticle size (hereafter referred to as MoS$_2$ IF-nanoparticles) to the same base fluid that was measured as sample 3(a). The MOS$_2$ IF-nanoparticles were provided in powder form having a diameter ranging from 1.5 µm to 2 µm.

Sample 3(c) of example 3 included 1 wt. % tungsten disulfide having a fullerene like geometry and nanoparticle size (hereafter referred to as WS2 IF-nanoparticles). The WS2 IF-nanoparticles had a particle size of 50 nm to 180 nm. Following the preparation of Samples 3(a), 3(b) and 3(c), the samples were measured for viscosity (ASTM D 445) and tested for weld load (ASTM D2596), wear scaring (ASTM D2266) and Friction Coefficient (D2266). The measured values are including in TABLE 3, as follows:

TABLE 2

Example 2: LITHIUM GREASE

| Specification | Unit | Method ASTM | Sample 2(a) (SA2(a)) Neat Grease | Sample 2(b) (SA2(b)) Neat Grease + 1% MOS$_2$ | Sample 2(c) (SA2(c)) Neat Grease + 1% WS$_2$ |
|---|---|---|---|---|---|
| Base Fluid-Type | | | Naphthenic Oil + Gr II | Naphthenic Oil + Gr II | Naphthenic Oil + Gr II |
| Viscosity of the Oil @ 40° C. | mm$^2$/s | D 445 | 200 | 200 | 200 |
| NLGI grade | | D 217 | 2 | 2 | 2 |
| Dropping Point | ° C. | IP 396 | 198.8 | | |
| 4-ball; weld load | Kg f | D 2596 | 160 | 200 | 315 |
| 4-ball; wear scar | mm | D 2266 | 0.790 | 0.880 | 0.495 |
| 4-ball Friction Coefficient | | D 2266 | 0.0997 | 0.0964 | 0.0900 |

TABLE 3

Example 3: LITHIUM GREASE

| Specification | Unit | Method ASTM | Sample 3(a) (SA3(a)) Neat Grease | Sample (3b) (SA3(b)) Neat Grease + 1% MOS$_2$ | Sample (3C) (SA3(c)) Neat Grease + 1% WS$_2$ |
|---|---|---|---|---|---|
| Base Fluid-Type | | | Naphthenic Oil + Gr II | Naphthenic Oil + Gr II | Naphthenic Oil + Gr II |
| Viscosity of the Oil @ 40° C. | mm$^2$/s | D 445 | 200 | 200 | 200 |
| NLGI grade | | D 217 | 1 | 1 | 1 |
| Dropping Point | ° C. | IP 396 | 192.2 | | |
| 4-ball; weld load | Kg f | D 2596 | 160 | 250 | 400 |
| 4-ball; wear scar | mm | D 2266 | 0.800 | 0.72 | 0.565 |
| 4-ball Friction Coefficient | | D 2266 | 0.0921 | 0.0967 | 0.0728 |

Example 4, samples 4(a), 4(b) and 4(c) were prepared as lithium complex grease (e.g., simple soap lithium greases, which result from the reaction of one fatty acid and a metallic hydroxide). Lithium complex greases are thickened with a complex soap, e.g., by employing a metallic hydroxide. In order to create the complex-thickened grease, a fatty acid is combined with a short chain complexing acid. The acid mixture is then combined with a metallic hydroxide to for a complex thickener. Lithium complex grease are made with lithium hydroxide, 12 HSA, and a second acid such as azelaic acid or sebacic acid or boric acid. Azelaic acid was used for the lithium complex greases that provided the samples for each of the examples in the experimental results section. In sample 4(a) of Example 4, the base fluid was naphthenic oil mixed with a group I paraffinic oil (Naphthenic Oil+Gr I). Group I base oils are classified as less than 90 percent saturates, greater than 0.03 percent sulfur and with a viscosity-index range of 80 to 120. The temperature range for these oils is from 32 to 150 degrees F. Group I base oils are solvent-refined. Sample 4(a) included 12.8% thickener, and 43.3% naphthenic base fluid, as well as 43.9% group I paraffinic oil.

Sample 4(b) of Example 4 included 1 wt. % molybdenum disulfide having a fullerene like geometry and nanoparticle size (hereafter referred to as MoS$_2$ IF-nanoparticles) to the same base fluid lithium complex soap combination that was employed in Sample 4(a). The MoS$_2$ IF-nanoparticles were provided in powder form having a diameter ranging from 1.5 µm to 2.0 µm.

Sample 4(c) of Example 4 included 1 wt. % tungsten disulfide having a fullerene like geometry and nanoparticle size (hereafter referred to as WS$_2$ IF-nanoparticles). The WS$_2$ IF-nanoparticles had a particle size of 50 nm to 180 nm. Following the preparation of Samples 4(a), 4(b) and 4(c), the samples were measured for viscosity (ASTM D 445) and tested for weld load (ASTM D2596), wear scaring (ASTM D2266) and Friction Coefficient (D2266). The measured values are including in TABLE 4, as follows:

TABLE 4

EXAMPLE 4: LITHIUM COMPLEX GREASE

| Specification | Unit | Method ASTM | Sample 4(a) (SA4(a)) Neat Grease | Sample 4(b) (SA4(b)) Neat Grease + 1% MOS$_2$ | Sample 4(c) (SA4(c)) Neat Grease + 1% WS$_2$ |
|---|---|---|---|---|---|
| Base Fluid-Type | | | Naphthenic Oil + Gr I | Naphthenic Oil + Gr I | Naphthenic Oil + Gr I |
| Viscosity of the Oil @ 40° C. | mm$^2$/s | D 445 | 200 | 200 | 200 |
| NLGI grade | | D 217 | 2 | 2 | 2 |
| Dropping Point | ° C. | IP396 | >280 | >280 | >280 |
| 4-ball; weld load | Kg f | D 2596 | 200 | 250 | 315 |
| 4-ball; wear scar | mm | D 2266 | 0.813 | 0.70 | 0.410 |
| 4-ball Friction Coefficient | | D 2266 | 0.0873 | 0.0606 | 0.0710 |

Example 5, samples 5(a), 5(b) and 5(c) were prepared as lithium complex grease In sample 5(a) of Example 5, the base fluid was naphthenic oil. Sample 5(a) included 8.25% thickener, and 91.75 naphthenic base fluid.

Sample 5(b) of Example 5 included 1 wt. % molybdenum disulfide having a fullerene like geometry and nanoparticle size (hereafter referred to as MoS$_2$ IF-nanoparticles) to the same base fluid lithium complex soap combination that was employed in Sample 5(a). The MoS$_2$ IF-nanoparticles were provided in powder form having a diameter ranging from 1.5 µm to 2 µm. Sample 5(c) of Example 5 included 1 wt. % tungsten disulfide having a fullerene like geometry and nanoparticle size (hereafter referred to as WS$_2$ IF-nanoparticles). The WS$_2$ IF-nanoparticles had a particle size of 50 nm to 180 nm. Following the preparation of Samples 5(a), 5(b) and 5(c), the samples were measured for viscosity (ASTM D 445) and tested for weld load (ASTM D2596), wear scaring (ASTM D2266) and Friction Coefficient (D2266). The measured values are including in TABLE 5, as follows:

TABLE 5

EXAMPLE 5: LITHIUM COMPLEX GREASE

| Specification | Unit | Method ASTM | Sample 5(a) (SA5(a)) Neat Grease | Sample 5(b) (SA5(b)) Neat Grease + 1% MOS$_2$ | Sample 5(c) (SA5(c)) Neat Grease + 1% WS$_2$ |
|---|---|---|---|---|---|
| Base Fluid-Type | | | Naphthenic Oil | Naphthenic Oil | Naphthenic Oil |
| Viscosity of the Oil @ 40° C. | mm$^2$/s | D 445 | 600 | 600 | 600 |
| NLGI grade | | D 217 | 2 | 2 | 2 |
| Dropping Point | ° C. | IP 396 | >280 | >280 | >280 |
| 4-ball; weld load | Kg f | D 2596 | 160 | 250 | 400 |
| 4-ball; wear scar | mm | D 2266 | 0.800 | 0.805 | 0.530 |
| 4-ball Friction Coefficient | | D 2266 | 0.0787 | 0.0815 | 0.0630 |

Example 6, samples 6(a), 6(b) and 6(c) were prepared as lithium complex grease (e.g., simple soap lithium greases, which result from the reaction of one fatty acid and a metallic hydroxide). In sample 6(a) of Example 6, the base fluid was naphthenic oil mixed with a group II paraffinic oil (Naphthenic Oil+Gr II). Sample 6(a) included 7.20% thickener, and 46.40% naphthenic base fluid, as well as 46.40% group II paraffinic oil.

Sample 6(b) of Example 6 included 1 wt. % molybdenum disulfide having a fullerene like geometry and nanoparticle size (hereafter referred to as MoS$_2$ IF-nanoparticles) to the same base fluid lithium complex soap combination that was employed in Sample 6(a). The MoS$_2$ IF-nanoparticles were provided in powder form having a diameter ranging from 1.5 μm to 2 μm. Sample 6(c) of Example 6 included 1 wt. % tungsten disulfide having a fullerene like geometry and nanoparticle size (hereafter referred to as WS$_2$ IF-nanoparticles). The WS$_2$ IF-nanoparticles had a particle size of 50 nm to 180 nm. Following the preparation of Samples 6(a), 6(b) and 6(c), the samples were measured for viscosity (ASTM D 445) and tested for weld load (ASTM D2596), wear scaring (ASTM D2266) and Friction Coefficient (D2266). The measured values are including in TABLE 6, as follows:

TABLE 6

EXAMPLE 6: LITHIUM COMPLEX GREASE

| Specification | Unit | Method ASTM | Sample 6(a) (SA6(a)) Neat Grease | Sample 6(b) (SA6(b)) Neat Grease + 1% MOS$_2$ | Sample 6(c) (SA6(c)) Neat Grease + 1% WS$_2$ |
|---|---|---|---|---|---|
| Base Fluid-Type | | | Naphthenic Oil + Gr II | Naphthenic Oil + Gr II | Naphthenic Oil + Gr II |
| Viscosity of the Oil @ 40° C. | mm$^2$/s | D 445 | 200 | 200 | 200 |
| NLGI grade | | D 217 | 1 | 1 | 1 |
| Dropping Point | ° C. | IP396 | >280 | >280 | >280 |
| 4-ball; weld load | Kg f | D 2596 | 200 | 250 | 400 |
| 4-ball; wear scar | mm | D 2266 | 0.910 | 0.785 | 0.585 |
| 4-ball Friction Coefficient | | D 2266 | 0.0933 | 0.0882 | 0.0884 |

Example 7, samples 7(a), 7(b) and 7(c) were prepared as lithium complex grease (e.g., simple soap lithium greases, which result from the reaction of one fatty acid and a metallic hydroxide).

Sample 7(b) of Example 7 included 1 wt. % molybdenum disulfide having a fullerene like geometry and nanoparticle size (hereafter referred to as MoS$_2$ IF-nanoparticles) to the same base fluid lithium complex soap combination that was employed in Sample 7(a). The MoS$_2$ IF-nanoparticles were provided in powder form having a diameter ranging from 1.5 μm to 2 μm. Sample 7(c) of Example 7 included 1 wt. % tungsten disulfide having a fullerene like geometry and nanoparticle size (hereafter referred to as WS$_2$ IF-nanoparticles). The WS$_2$ IF-nanoparticles had a particle size of 50 nm to 180 nm. Following the preparation of Samples 7(a), 7(b) and 7(c), the samples were measured for viscosity (ASTM D 445) and tested for weld load (ASTM D2596), wear scaring (ASTM D2266) and Friction Coefficient (D2266). The measured values are including in TABLE 7, as follows:

TABLE 7

EXAMPLE 7: LITHIUM COMPLEX GREASE

| Specification | Unit | Method ASTM | Sample 7(a) (SA7(a)) Neat Grease | Sample 7(b) (SA7(b)) Neat Grease + 1% $MoS_2$ | Sample 7(c) (SA7(c)) Neat Grease + 1% $WS_2$ |
|---|---|---|---|---|---|
| Base Fluid-Type | | | Naphthenic Oil | Naphthenic Oil | Naphthenic Oil |
| Viscosity of the Oil @ 40° C. | mm$^2$/s | D 445 | 600 | 600 | 600 |
| NLGI grade | | D 217 | 1 | 1 | 1 |
| Dropping Point | ° C. | IP396 | >280 | >280 | >280 |
| 4-ball; weld load | Kg f | D 2596 | 160 | 315 | 620 |
| 4-ball; wear scar | mm | D 2266 | 0.755 | 0.750 | 0.46 |
| 4-ball Friction Coefficient | | D 2266 | 0.0974 | 0.1073 | 0.0744 |

Weld Load

It was observed, that with concentrations of 1 wt. % $WS_2$ IF-nanoparticles or $MoS_2$ IF-nanoparticles can substantially increase the weld load, as measured by 4-ball weld load testing in accordance with ASTM D2596.

Figure 13:
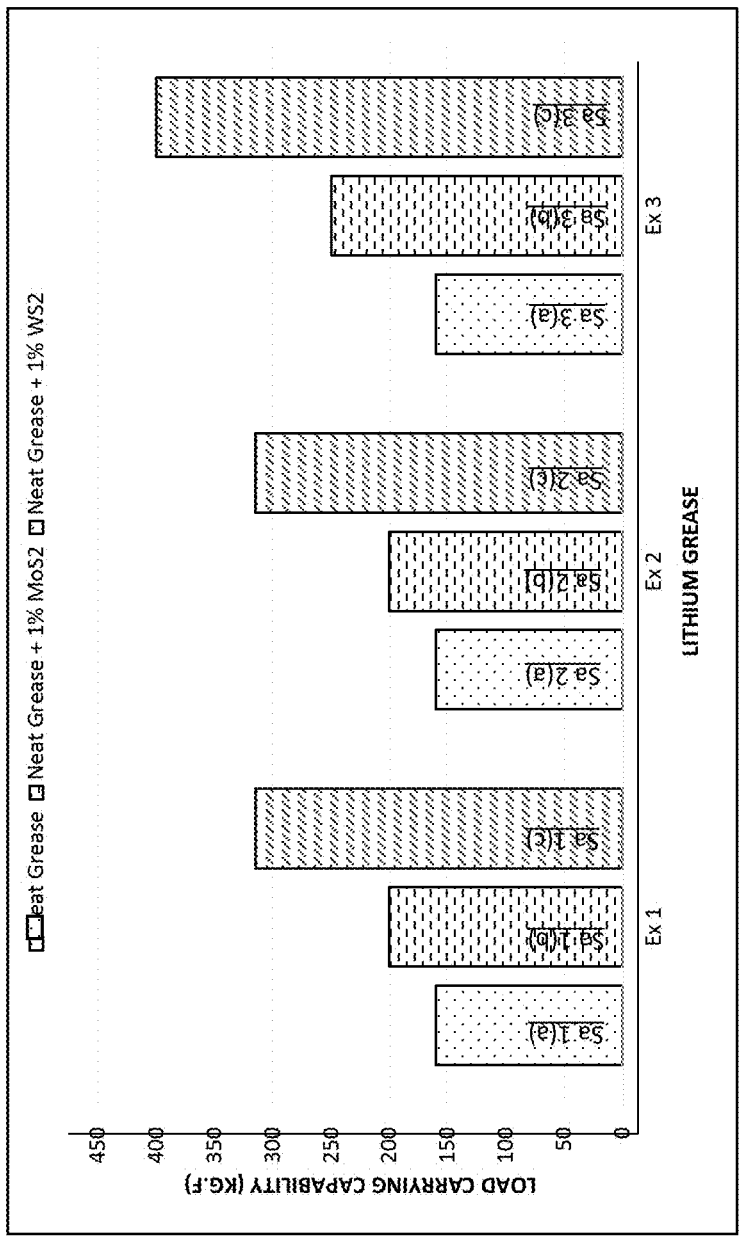
FIG. 13 is a plot demonstrating the impact of 1 wt. % of solid lubricants on the Load carrying capability of Lithium greases, for examples 1-3 including samples 1(a)-3(c), according to ASTM D 2596.

FIG. 13 is a plot demonstrating the impact of 1 wt % of solid lubricants on the load carrying, i.e., weld load, capability of Lithium greases measured from Examples 1-3 including samples 1(a)-3(c). The samples not including the inorganic fullerene metal chalcogenide nanoparticles had the lowest load carrying performance. Generally, the weld load of the neat greases was equal to 160 kg for less. This was true in the sample of base fluid being solely naphthenic oil, e.g., SA1(a), as well as the samples of base fluid including naphthenic oil mixed with group 1/group 2 paraffinic oil (i.e., samples SA2(a) and SA3(a)).

In comparison to the neat Lithium greases, the addition of metal chalcogenide inorganic fullerene (IF) nanoparticles provided a measurable and significant increase the loading, e.g., weld loading, as measured using ASTM D2596. Referring first to additions of 1 wt. % molybdenum disulfide ($MoS_2$) inorganic fullerene nanoparticles, the weld load increased from 160 kg f to 200 kg f. This was the case for both Examples 1 and 2, i.e., sample SA1(b) and sample SA2(b). However, even greater weld load was measured from Example 3, i.e., sample SA3(b), in which the weld load increased to 250 Kg f. Sample SA3(b) was a lithium grease including a base of naphthenic oil mixed with group 2 paraffinic oil and including 1 wt. % molybdenum disulfide ($MoS_2$) inorganic fullerene nanoparticles.

Greater increases in weld load were measured from lithium greases including additions of 1 wt. % tungsten disulfide ($WS_2$). For example, weld loads were measured from lithium soap thickened greases ranging from 315 kg F to 400 kg f. Measurements of 315 kg f were measured from Examples 1 and 2, i.e., sample SA1(c) and sample SA2(c). However, even greater weld load was measured from Example 3, i.e., sample SA3(b), in which the weld load increased to 400 kg f Sample SA3(b) was a lithium grease including a base of naphthenic oil mixed with group 2 paraffinic oil and including 1 wt. % tungsten disulfide ($WS_2$) inorganic fullerene nanoparticles.

For the 1 wt. % additive of inorganic fullerene metal chalcogenide nanoparticles to the lithium soap thickened Naphthenic oil, when compared to the neat grease, i.e., Sample 1(a) not including inorganic fullerene additive, having a weld load value of 160 kg f, the similar composition grease with an addition of 1 wt. % molybdenum disulfide ($MoS_2$) inorganic fullerene (Sample 1(b), increased the weld load value to 200 kg f. This represents a 25% increase in weld load resulting solely from the addition of 1 wt. % molybdenum disulfide ($MoS_2$) inorganic fullerene. Even greater increases were measured from the sample including tungsten disulfide inorganic fullerene (IF) additive. For the 1 wt. % additive of tungsten disulfide ($WS_2$) nanoparticles to the lithium soap thickened Naphthenic oil, when compared to the neat grease, i.e., Sample 1(a) not including inorganic fullerene additive, having a weld load value of 160 kg f, the similar composition grease with an addition of 1 wt. % tungsten disulfide ($WS_2$) inorganic fullerene (Sample 1(c), increased the weld load value to 315 kg f. This represents a substantially 100% increase (e.g., 97%) in weld load resulting solely from the addition of 1 wt. % molybdenum disulfide ($MoS_2$) inorganic fullerene. In this example for a 1 wt. % addition of inorganic fullerene nanoparticle to a lithium soap thickened Naphthenic oil increases ranging from 25% to 100% weld loading were measured when compared to a neat grease of lithium soap thickened Naphthenic that does not include inorganic fullerene nanoparticle additive. Although not included in the data, increasing the wt. % for the inorganic fullerene additive can further increase the weld load value of the grease.

Figure 14:
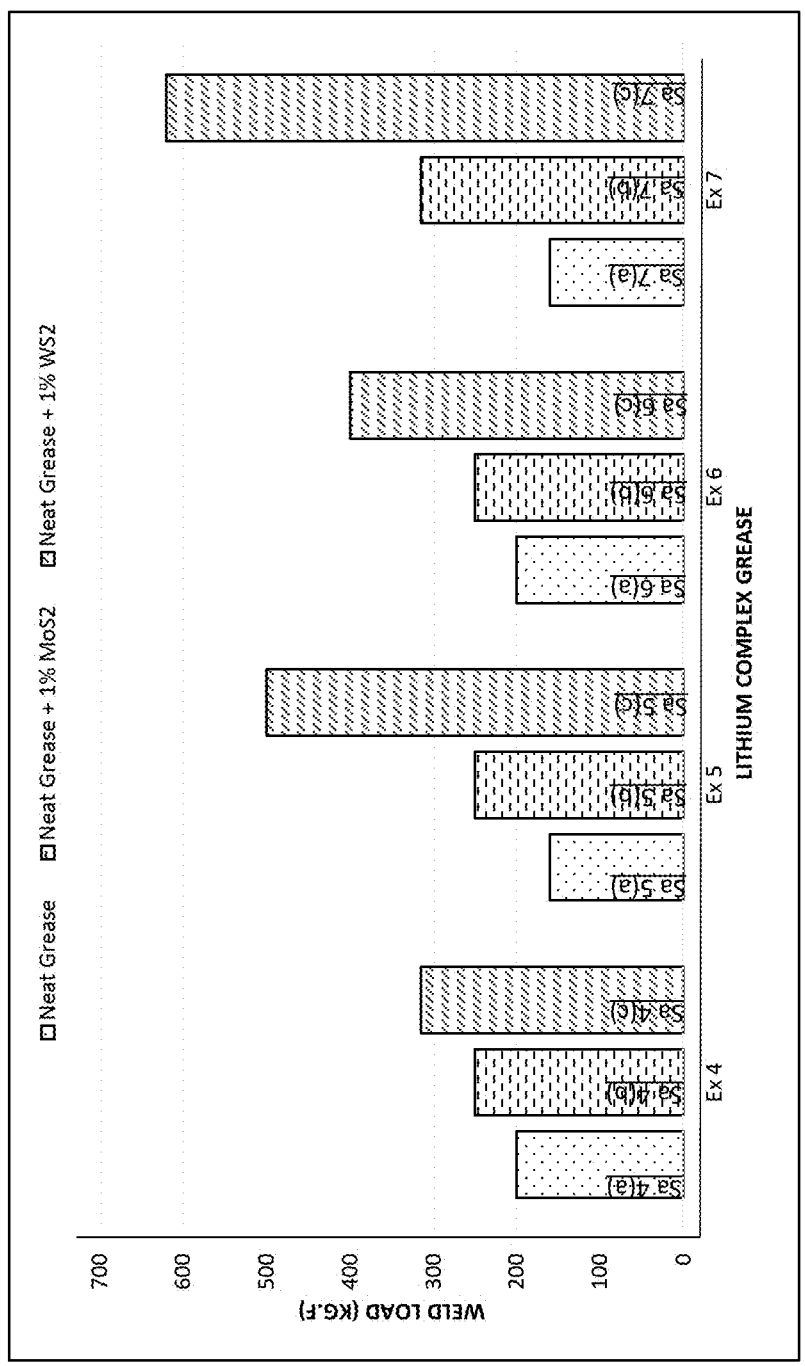
FIG. 14 is a plot demonstrating the impact of 1 wt. % of solid lubricants on the Load carrying capability of Lithium complex greases for examples 4-6 including samples 4(a)-6(c), according to ASTM D 2596.

FIG. 14 is a plot indicating the impact of 1 wt. % of solid lubricants on the load carrying capability of Lithium complex greases for examples 4-6 including samples 4(a)-7(c), according to ASTM D 2596. The samples if lithium complex thickened greases not including the inorganic fullerene metal chalcogenide nanoparticles had the lowest load carrying performance. Generally, for the lithium complex thickened greases, the weld load of the neat greases was equal ranged from 160 kg F to 200 kg f. The lithium complex sample composed of the base fluid solely of naphthenic oil, e.g., SA7(a), the weld load was measured as 160 kg f. The lithium complex samples including a base fluid with a mixture of naphthenic oil and group 1/group 2 paraffinic oil respectively (i.e., samples SA4(a) and SA6(a)) had measured weld loads on the order of 200 kg f Samples SA4(a), SA5(a), SA6(a), and SA7(a) each did not include metal chalcogenide inorganic fullerene (IF) nanoparticles and are referred to as neat lithium complex greases.

In comparison to the neat lithium complex greases, the addition of metal chalcogenide inorganic fullerene (IF) nanoparticles provided a measurable and significant increase the loading, e.g., weld loading, as measured using ASTM D2596. Referring first to additions of 1 wt. % tungsten disulfide ($WS_2$) inorganic fullerene nanoparticles, the weld load increased from being within a range of 160 kg f to 200 kg f to being in an increased weld load ranging from 250 kg f to 620 kg f.

For example, referring to Example 4, sample 4(c), the addition of 1 wt. % tungsten disulfide ($WS_2$) to lithium complex thickened base fluid composed of naphthenic oil mixed with group 1 paraffinic oil increases the weld load to 3150 kg f from 160 kg f. This represents a potentially 100% increase (e.g., 97%) increase in weld load when comparing the neat grease with the grease including an additive of $WS_2$ IF.

Referring to Example 4, sample 4(b), the addition of 1 wt. % molybdenum disulfide ($MoS_2$) to lithium complex thickened base fluid composed of naphthenic oil mixed with group 1 paraffinic oil increases the weld load to 250 kg f from 160 kg f. This represents a potentially 60% increase (e.g., 56.25%) increase in weld load when comparing the neat grease with the grease including an additive of $MoS_2$ IF.

Referring to Example 5, sample 5(b), the addition of 1 wt. % molybdenum disulfide ($MoS_2$) to lithium complex thickened base fluid composed solely of naphthenic oil increases the weld load to 250 kg F from 160 kg F. This represents a potentially 60% increase (e.g., 56.25%) increase in weld load when comparing the neat grease with the grease including an additive of $MoS_2$ IF. Example 5, sample 5(c), included the addition of 1 wt. % tungsten disulfide ($WS_2$) to lithium complex thickened base fluid composed solely of naphthenic oil. Compared to Example 5, sample 5(a), which was a neat grease having substantially the same composition without any inorganic fullerene additive, the addition of tungsten disulfide inorganic fullerene nanoparticles at 1 wt. % increased the weld load to 400 kg f from 160 kg f. This represents a potentially 150% increase in weld load when comparing the neat grease with the grease including an additive of $WS_2$ IF.

For example, referring to Example 6, sample 6(b), the addition of 1 wt. % molybdenum disulfide ($MoS_2$) to lithium complex thickened base fluid composed of naphthenic oil mixed with group 2 paraffinic oil increases the weld load to 250 Kg F from 200 kg f Referring to Example 6, sample 6(c), the addition of 1 wt. % tungsten disulfide ($WS_2$) to lithium complex thickened base fluid composed of naphthenic oil mixed with group 2 paraffinic oil increases the weld load to 400 kg f from 200 kg f. This represents a 100% increase in weld load when comparing the neat grease with the grease including an additive of $WS_2$ IF.

The greatest weld load was measured by the addition of metal chalcogenide inorganic fullerene nanoparticles to lithium complex thickened base fluids composed solely of naphthenic oil. The weld load recorded for these samples (Example 7, samples 7b and 7c) may range from 315 kg f to 620 kg f.

For example, referring to Example 7, sample 7(b), the addition of 1 wt. % molybdenum disulfide ($MoS_2$) to lithium complex thickened base fluid composed of naphthenic oil increases the weld load to 315 kg f from 160 kg f. This represents a substantially 100% (e.g., 96.5%) increase in weld load when comparing the neat grease with the grease including an additive of $MoS_2$ IF. Referring to Example 7, sample 7(c), the addition of 1 wt. % tungsten disulfide ($WS_2$) to lithium complex thickened base fluid composed of naphthenic oil mixed with group 2 paraffinic oil increases the weld load to 620 kg f from 160 kg f. This represents a substantially 285% increase in weld load when comparing the neat grease with the grease including an additive of $WS_2$ IF.

Weld Scar

Figure 15:
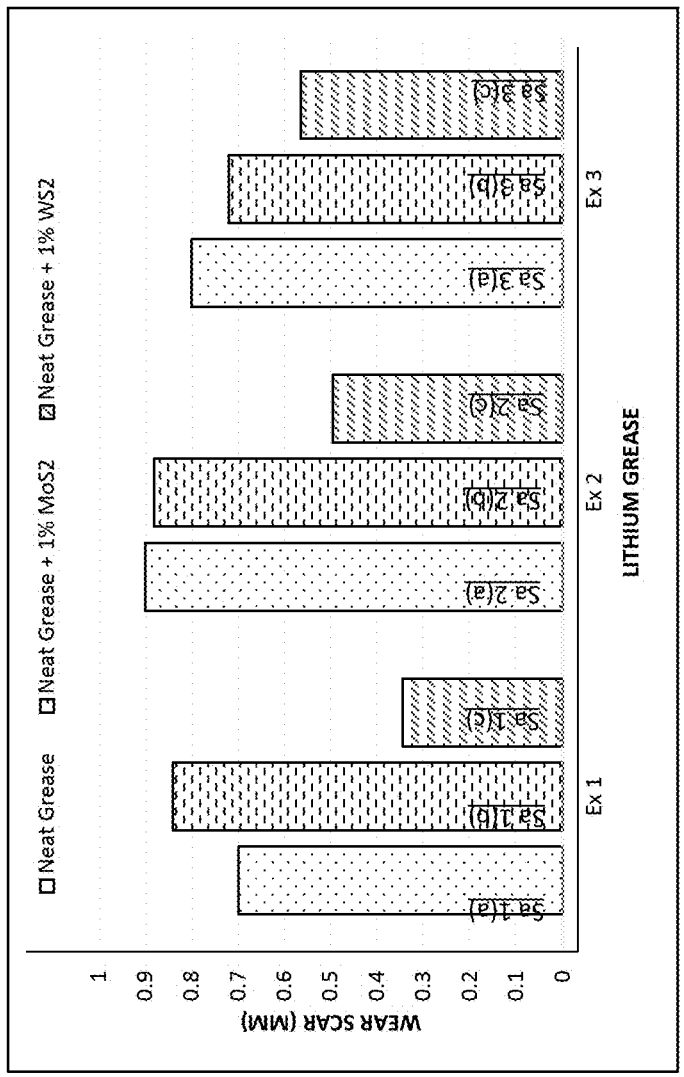
FIG. 15 is a plot demonstrating the impact of 1 wt. % of solid lubricants on the wear scar diameter of Lithium greases for examples 1-3 including samples 1(a)-3(c), according to ASTM D 2266.
Figure 16:
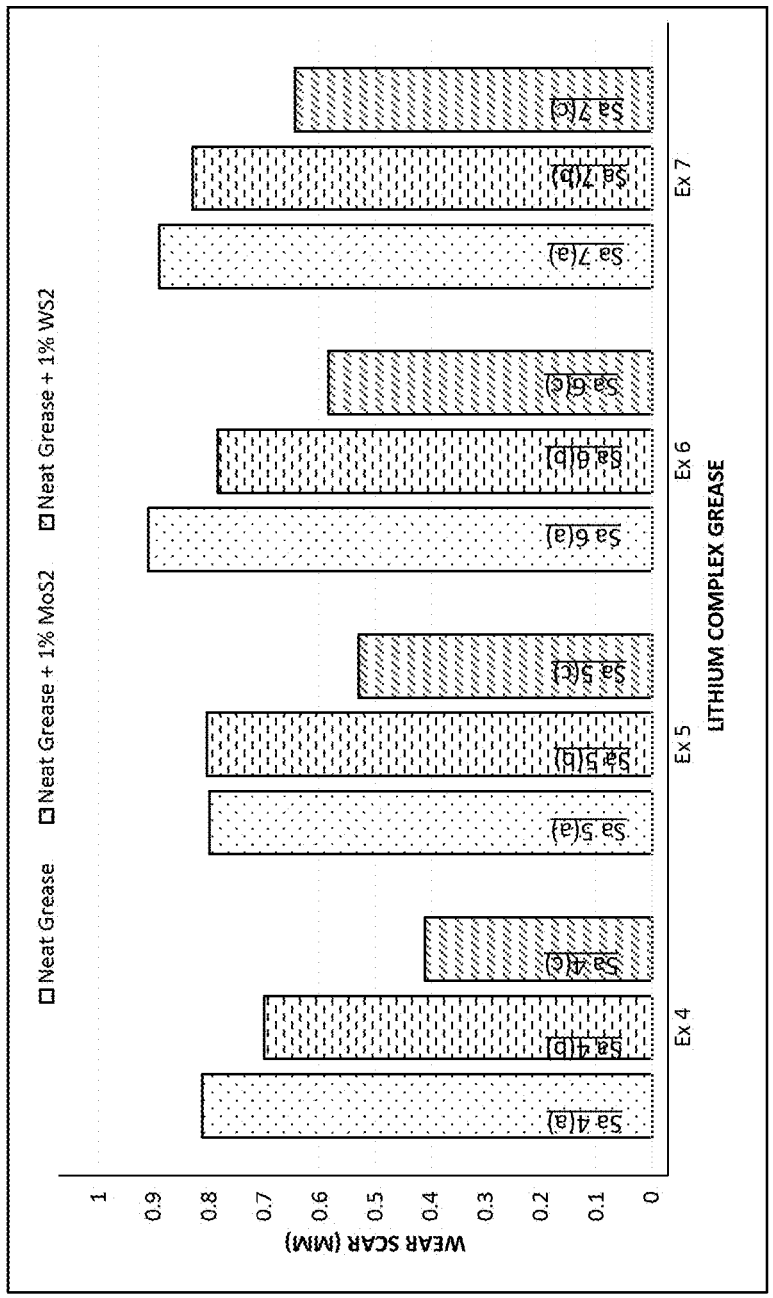
FIG. 16 is a plot demonstrating the impact of 1 wt. % of solid lubricants on the wear scar diameter of Lithium complex greases for examples 4-7 including samples 4(a)-7(c), according to ASTM D 2266.

It was observed, that with concentrations of 1 Wt. % $WS_2$ IF-nanoparticles or $MoS_2$ IF-nanoparticles can reduce weld scar diameter. FIG. 15 is a plot indicating the impact of 1 wt. % of solid lubricants on the wear scar diameter of Lithium Greases for examples 1-3 including samples 1(a)-3(c), according to ASTM D 2266. FIG. 16 is a plot is a plot indicating the impact of 1 wt. % of solid lubricants on the wear scar diameter of Lithium complex greases for examples 4-7 including samples 4(a)-7(c), according to ASTM D 2266.

The weld scar diameter was measured from the neat greases ranged from 0.7 mm to 0.9 mm. This was true in the sample of base fluid being solely naphthenic oil, e.g., SA1(a), as well as the samples of base fluid including naphthenic oil mixed with group 1/group 2 paraffinic oil (i.e., samples SA2(a) and SA3(a)).

For the lithium soap thickened greases including metal chalcogenide inorganic fullerene additive, the measured data clearly illustrates a reduction in wear scar diameter for Example 1, sample 1(c) (SA1(c)); Example 2, sample 2(c) (SA2(c)); Example 3, sample 3(b)(SA3(b); and Example 3, sample 3(c)(SA3(c). Example 1, sample 1(c) (SA1(c)), was a lithium soap thickened grease for a base fluid composed solely of naphthenic oil. In this example, the tungsten disulfide inorganic fullerene additive in 1 wt. % result in a wear scar diameter of 0.3 mm, which was a reduction from 0.7 mm for an identical sample with the exception of not including metal chalcogenide inorganic fullerene additive. Example 2, sample 1(c) (SA1(c)), was a lithium soap thickened grease for a base fluid composed solely of naphthenic oil. In this example, the tungsten disulfide inorganic fullerene additive in 1 wt. % result in a wear scar diameter of 0.3 mm, which was a reduction from 0.7 mm for an identical sample with the exception of not including metal chalcogenide inorganic fullerene additive.

Sample 2(c) of example 2 included 1 wt. % tungsten disulfide having a fullerene like geometry and nanoparticle size (hereafter referred to as $WS_2$ IF-nanoparticles) to in a lithium grease using a base fluid that was naphthenic oil mixed with a group II paraffinic oil (Naphthenic Oil+Gr II). In this example, the tungsten disulfide inorganic fullerene additive in 1 wt. % result in a wear scar diameter of approximately 0.5 mm, which was a reduction from 0.9 mm for an identical sample with the exception of not including metal chalcogenide inorganic fullerene additive.

Example 3, sample 3(b)(SA3(b)) and Example 3, sample 3(c)(SA3(c)) were lithium greases including a base of naphthenic oil mixed with group 2 paraffinic oil and including 1 wt. % metal chalcogenide inorganic fullerene nanoparticles. Sample 3(b)(SA3(b)) included molybdenum disulfide ($MoS_2$) and recorded a wear scar diameter of 0.72 mm, which was a reduction from a comparative composition neat lithium grease that recorded a 0.8 wear scar diameter. Sample 3(c)(SA3(c)) included tungsten disulfide ($WS_2$) and recorded a wear scar diameter of 0.565 mm, which was a reduction from a comparative composition neat lithium grease that recorded a 0.8 wear scar diameter.

For the lithium complex soap thickened greases including metal chalcogenide inorganic fullerene additive, the measured data clearly illustrates a reduction in wear scar diameter for each lithium complex soap thickened grease composition including metal chalcogenide inorganic fullerene additives when compared to similar composition greases not including the inorganic fullerene additives. The neat lithium complex thickened greases, i.e., example 4, sample 4(a) (SA4(a)); example 6, sample 6(a)(SA6(a)); and example 7, sample 7(a)(SA7(a)), not including metal chalcogenide inorganic fullerene nanoparticles has a measured wear scar diameter ranging from 0.755 mm to 0.910 mm.

In comparison to the neat lithium complex thickened greases, similar composition greases having molybdenum disulfide inorganic fullerene additive at 1 wt. % (example 4, sample 4(b) (SA4(b)); example 6, sample 6(b)(SA6(b)); and example 7, sample 7(b)(SA7(b)), where characterized by a reduced wear scar diameter ranging from 0.7 mm to 0.785 mm. As illustrated in Tables 4-7, and the plot in FIG. 16, for each composition of base fluid and lithium complex thickener, in each instance the addition of molybdenum disulfide inorganic fullerene reduced the wear scar measurements.

In comparison to the neat lithium complex thickened greases, similar composition greases having tungsten disulfide inorganic fullerene additive at 1 wt. % (example 4, sample 4(c) (SA4(c)); example 6, sample 6(c)(SA6(c)); and example 7, sample 7(c)(SA7(c)), where characterized by a reduced wear scar diameter ranging from 0.410 mm to 0.585 mm. As illustrated in Tables 4-7, and the plot in FIG. 16, for each composition of base fluid and lithium complex thickener, in each instance the addition of tungsten disulfide inorganic fullerene reduced the wear scar measurements.

Coefficient of Friction

Figure 17:
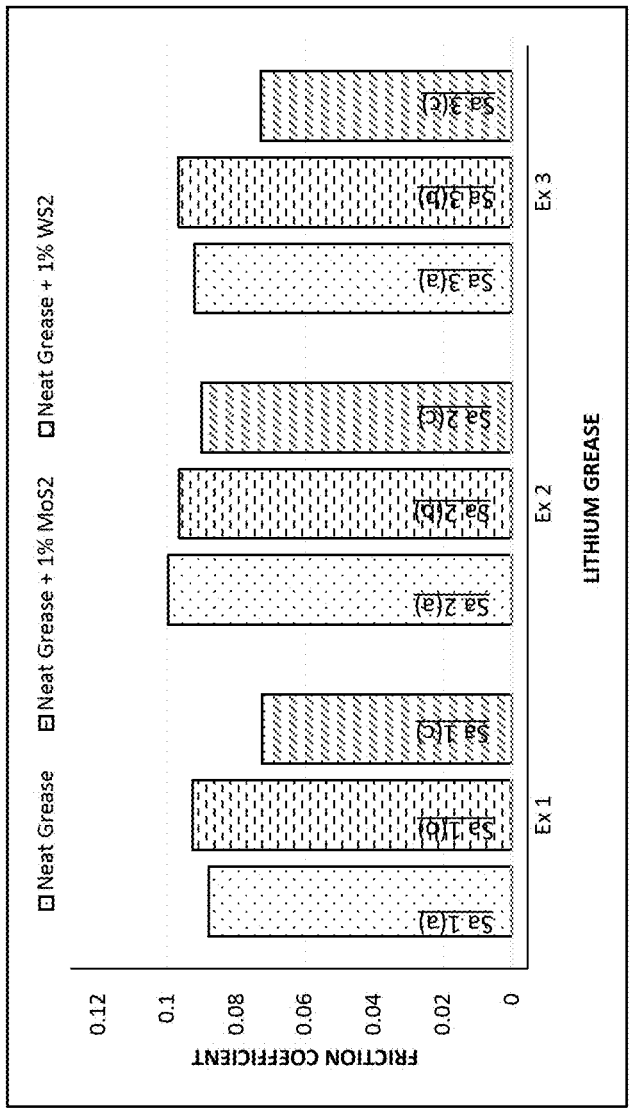
FIG. 17 is a plot demonstrating the impact of 1 wt. % of solid lubricants on the coefficient of friction of Lithium Greases for examples 1-3 including samples 1(a)-3(c), according to ASTM D 2266.
Figure 18:
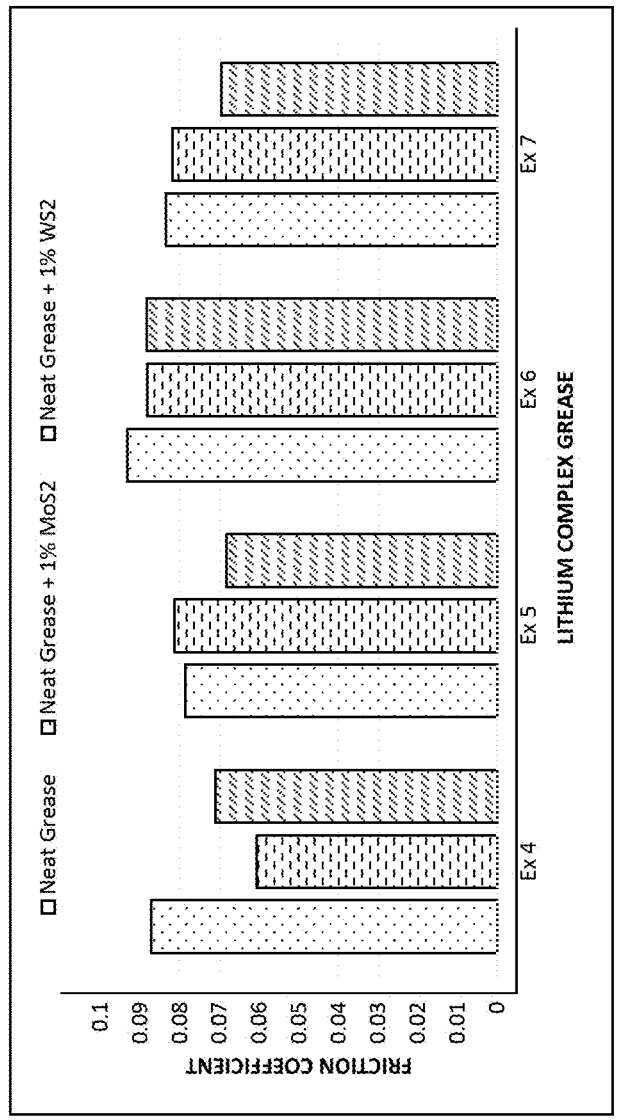
FIG. 18 is a plot demonstrating the impact of 1 wt. % of solid lubricants on the coefficient of friction of Lithium complex greases for examples 4-7 including samples 4(a)-7(c), according to ASTM D 2266.

It was observed, that with concentrations of 1 wt. % $WS_2$ IF-nanoparticles or $MoS_2$ IF-nanoparticles can reduce coefficient of Friction. FIG. 17 is a plot indicating the impact of 1 wt. % of solid lubricants on the coefficient of friction of Lithium Greases for examples 1-3 including samples 1(a)-3(c), according to ASTM D 2266. FIG. 18 is a plot indicating the impact of 1 wt. % of solid lubricants on the coefficient of friction of Lithium complex greases for examples 4-7 including samples 4(a)-7(c), according to ASTM D 2266.

The coefficient of friction was measured from the neat greases ranged from 0.879 to 0.0997. This was true in the sample of base fluid being solely naphthenic oil, e.g., SA1(a), as well as the samples of base fluid including naphthenic oil mixed with group 1/group 2 paraffinic oil (i.e., samples SA2(a) and SA3(a)).

For the lithium soap thickened greases including metal chalcogenide inorganic fullerene additive, the measured data clearly illustrates a reduction in coefficient of friction for Example 2, sample 2(b)(SA2(b)); Example 2, sample 2(c) (SA2(c)); and Example 3, sample 3 (c)(SA3 (c).

For the lithium complex soap thickened greases including metal chalcogenide inorganic fullerene additive, the measured data clearly illustrates a reduction in coefficient of friction for each lithium complex soap thickened grease composition including metal chalcogenide inorganic fullerene additives when compared to similar composition greases not including the inorganic fullerene additives. This is illustrated in Tables 4-7, and the plot in FIG. 18, for each composition of base fluid and lithium complex thickener, in each instance the addition of tungsten disulfide inorganic fullerene, as well as molybdenum disulfide, reduced the coefficient of friction measurements.

Having described preferred embodiments of a GREASE COMPOSITION INCLUDING INORGANIC FULLERENE-LIKE PARTICLES (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed:

1. A grease composition comprising:
   an oil based medium;
   a thickener;
   a metal chalcogenide material having a sheet-like geometry; and
   a fullerene-like nano-structure comprising a plurality of layers each comprised of a metal chalcogenide composition has a molecular formula of $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur(S), selenium (Se), tellurium (Te), oxygen (O) and combinations thereof, the fullerene-like nano-structure having a cage geometry that is hollow at its core and layered at its periphery, wherein the fullerene-like nano-structure is a double layered structure and is present in the grease composition as a dispersion of substantially non-agglomerated particles with diameter of less than 380 nm.

2. The grease composition of claim 1, wherein the thickener comprises a lithium based thickener, a lithium complex thickener, calcium based thickener, calcium complex based thickener, boric complex thickener, calcium sulfonate complex, lithium calcium based thickener, bentonite clay based thickener, urea thickener, polyolefin thickener, PTFE thickener, titanium complex thickener, aluminum complex type thickener or combinations thereof.

3. The grease composition of claim 1, wherein the metal chalcogenide composition is $MoS_2$ or $WS_2$.

4. The grease composition of claim 1, wherein the oil based medium is an oil composition selected from the group consisting of Group I oil, Group II oil, Group III, IV, and V oils, synthetic oils, mineral oils, bio-fluids and combinations thereof.

5. The grease composition of claim 1, wherein the oil-based medium is a synthetic oil having a composition selected from the group consisting of polyalpha-olefins, olefins, isomerized olefins, synthetic esters, phosphate esters, silicate esters, polyalkylene glycols and combinations thereof.

6. The grease composition claim 1, wherein the oil-based medium is a bio-lubricants selected from the group consisting of lanolin, whale oil, canola oil, castor oil, palm oil, sunflower seed oil, rapeseed oil, tall oil and combinations thereof.

7. The grease composition of claim 1, wherein the multi-layered fullerene-like nano-structure is spherical.

8. The grease composition of claim 1, wherein an outer layer of the multi-layered fullerene-like structure comprises at least one sectioned portion, the at least one sectioned portion extends along a direction away from the curvature of the multi-layered fullerene-like nano-structure, the at least one sectioned portion engaged to remaining section of the outer layer, the at least one sectioned portion having a length that is 80% of a diameter of the multi-layered fullerene-like structure.

9. A grease composition comprising:
   a naphthenic containing oil based medium;
   a lithium containing thickener;
   a metal dichalcogenide monolayer having a sheet-like geometry; and
   a fullerene-like nano-structure having a composition selected from the group consisting of tungsten disulfide ($WS_2$), molybdenum disulfide ($MoS_2$) and combinations thereof, the fullerene-like nano-structure having a cage geometry that is hollow at its core and layered at its periphery,
   wherein the fullerene-like nanostructure is a double layered structure, is present in amounts of 0.25 wt % or greater, and provides a load carrying capability that is at least 25% greater than similar composition greases not including additives of the fullerene-like nano-structures, and
   wherein the metal dichalcogenide monolayer is an atomically thin semiconductor of a type $MX_2$, wherein M is a transition metal atom selected from the group consisting of Mo and W and X is a chalcogen atom selected from the group consisting of S, Se and Te.

10. The grease composition of claim 9, wherein the lithium containing thickener is a lithium complex soap.

11. The grease composition of claim 9, wherein the lithium containing thickener is a lithium soap.

12. The grease composition of claim 9, wherein the naphthenic containing oil-based medium is further mixed with a group I paraffinic oil.

13. The grease composition of claim 9, wherein the naphthenic containing oil-based medium is further mixed with a group II paraffinic oil.

14. The grease composition of claim 9, wherein the fullerene-like structure is composed of molybdenum disulfide ($MoS_2$) having a particle size for the material ranging from 1.5 μm to 2.0 μm.

15. The grease composition of claim 9, wherein the fullerene like structure is composed of tungsten disulfide ($WS_2$) having a particle size ranging from 50 nm to 180 nm.

16. A method of forming a grease comprising:
blending a metallic soap with an oil-based medium to provide a grease;
forming a liquid dispersion containing a metal dichalcogenide monolayer having a sheet-like geometry, the liquid dispersion further containing a fullerene-like nano-structure comprising a plurality of layers each comprised of a metal chalcogenide composition that has a molecular formula of $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur(S), selenium (Se), tellurium (Te), oxygen (O) and combinations thereof, the fullerene-like nano-structure having a cage geometry that is hollow at its core and layered at its periphery; and
providing a mixture of the grease with the liquid dispersion containing the metal dichalcogenide monolayer and the fullerene-like nano-structure,
wherein the metal dichalcogenide monolayer is an atomically thin semiconductor of a type $MX_2$, and
wherein the fullerene-like nano-structure is a double layered structure and is present in the grease as a dispersed phase that is substantially non-agglomerated particles with diameter of less than 380 nm.

17. The method of claim 16, wherein the thickener comprises a lithium-based thickener, calcium thickener, calcium complex thickener, boric complex thickener, calcium sulfonate complex, lithium calcium-based thickener, bentonite clay based thickener, urea thickener, PTFE thickener, aluminum complex type thickener or combinations thereof.

18. The method of claim 16, wherein the metal chalcogenide is $MoS_2$ or $WS_2$.

19. The method of claim 16, wherein the oil-based medium comprises naphthenic oil.

20. The method of claim 17, wherein the oil-based medium is an oil composition selected from the group consisting of Group I oil, Group II oil, Group III, IV, and V oils, synthetic oils, mineral oils, bio-fluids and combinations thereof.

* * * * *